United States Patent
Datta et al.

(10) Patent No.: US 12,254,548 B1
(45) Date of Patent: Mar. 18, 2025

(54) LISTENER ANIMATION

(71) Applicant: Amazon Technologies, Inc., Seattle, WA (US)

(72) Inventors: Gourav Datta, Los Angeles, CA (US); Vivek Yadav, Lakewood, CO (US); Yue Wu, Torrance, CA (US); Ayush Jaiswal, Redondo Beach, CA (US); Rajiv M Reddy, Bellevue, WA (US); Prateek Singhal, San Francisco, CA (US); Karthik Ramakrishnan, Bellevue, WA (US); Premkumar Natarajan, Rolling Hills Estates, CA (US)

(73) Assignee: Amazon Technologies, Inc., Seattle, WA (US)

(*) Notice: Subject to any disclaimer, the term of this patent is extended or adjusted under 35 U.S.C. 154(b) by 181 days.

(21) Appl. No.: 18/082,709

(22) Filed: Dec. 16, 2022

(51) Int. Cl.
| | |
|---|---|
| *G06T 7/20* | (2017.01) |
| *G06T 7/70* | (2017.01) |
| *G06T 13/20* | (2011.01) |
| *G06T 13/40* | (2011.01) |
| *G06V 40/16* | (2022.01) |
| *G10L 15/22* | (2006.01) |
| *G10L 25/57* | (2013.01) |
| *G10L 25/60* | (2013.01) |

(52) U.S. Cl.
CPC ............ *G06T 13/205* (2013.01); *G06T 7/20* (2013.01); *G06T 7/70* (2017.01); *G06T 13/40* (2013.01); *G06V 40/176* (2022.01); *G10L 15/22* (2013.01); *G10L 25/57* (2013.01); *G10L 25/60* (2013.01); *G06T 2207/30201* (2013.01)

(58) Field of Classification Search
CPC ....... G06V 40/176; G10L 15/22; G10L 25/57; G10L 25/60; G06T 7/20; G06T 7/70; G06T 13/205; G06T 13/40; G06T 2207/30201
USPC ......................................................... 345/473
See application file for complete search history.

(56) References Cited

U.S. PATENT DOCUMENTS

| | | | |
|---|---|---|---|
| 10,521,946 B1* | 12/2019 | Roche ..................... | G10L 13/00 |
| 10,586,369 B1* | 3/2020 | Roche ..................... | G10L 13/00 |
| 2006/0074689 A1* | 4/2006 | Cosatto .................. | G10L 21/06 |
| | | | 704/275 |
| 2020/0279553 A1* | 9/2020 | McDuff .................. | G10L 25/78 |
| 2024/0070951 A1* | 2/2024 | Tiwari ................... | G06N 20/00 |

* cited by examiner

*Primary Examiner* — Jacinta M Crawford
(74) *Attorney, Agent, or Firm* — Pierce Atwood LLP

(57) ABSTRACT

A system configured to perform style-aware listener animation. By representing different listening styles (e.g., facial expressions) using an embedding space, a single model can be trained to generate unique facial animations for a number of distinct listeners. Thus, individual listening styles can be associated with a listener identifier, enabling the system to (i) animate a plurality of different listeners with unique nonverbal behavior and/or (ii) select a particular listener identifier or desired type of listener style with which to animate. This enables the model to be generalized to new listeners to generate additional listener facial responses without needing training data for each new listener. The model may process a listener representation style or listener identifier, along with input data corresponding to a speaker talking, to generate unique facial animation responsive to the speech.

19 Claims, 26 Drawing Sheets

FIG. 1
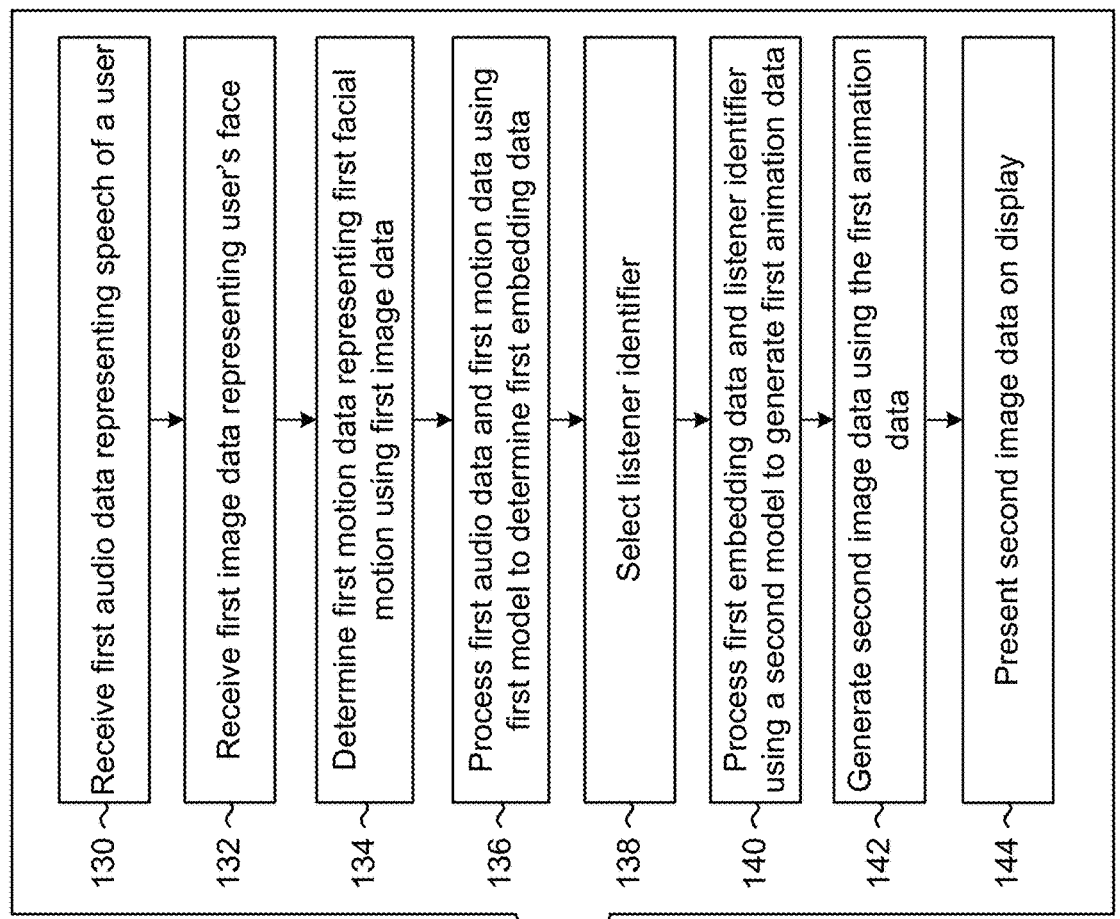
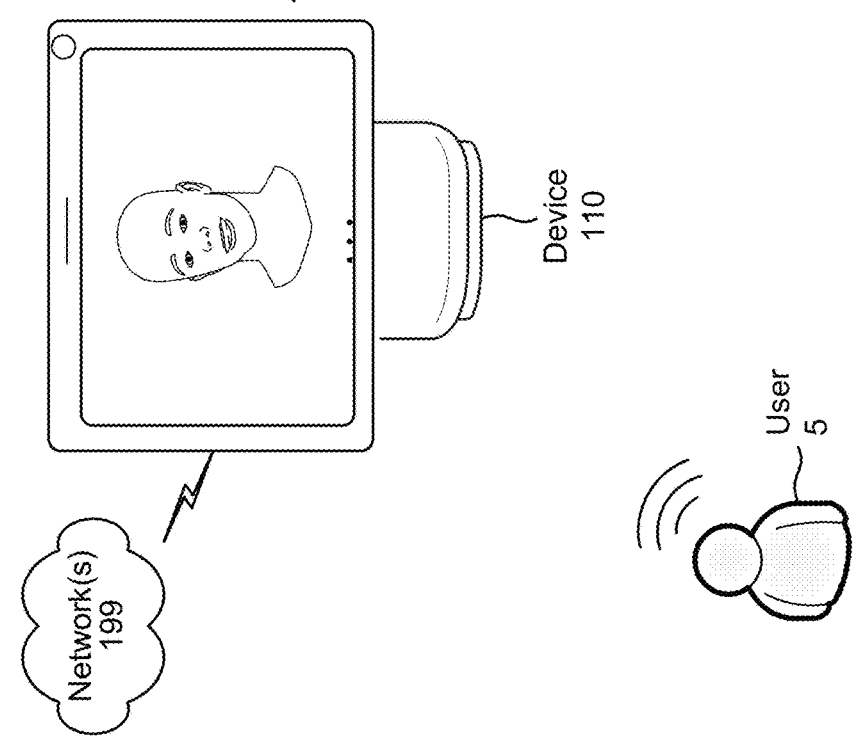

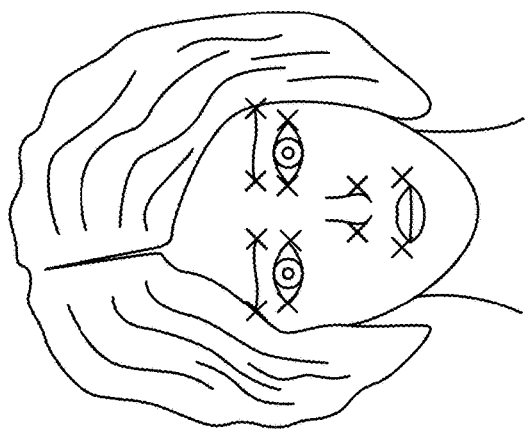
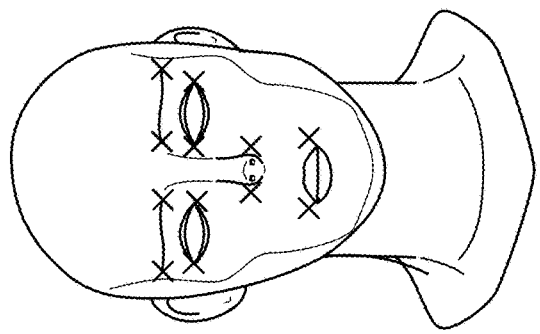
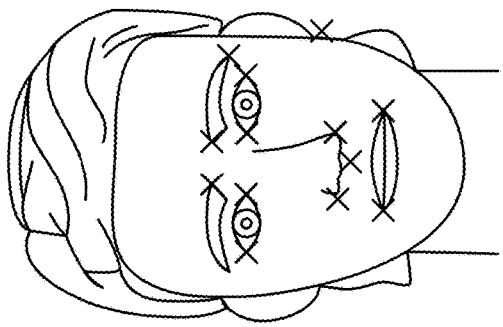
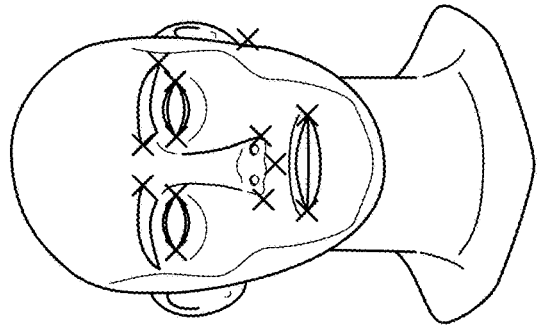
FIG. 10

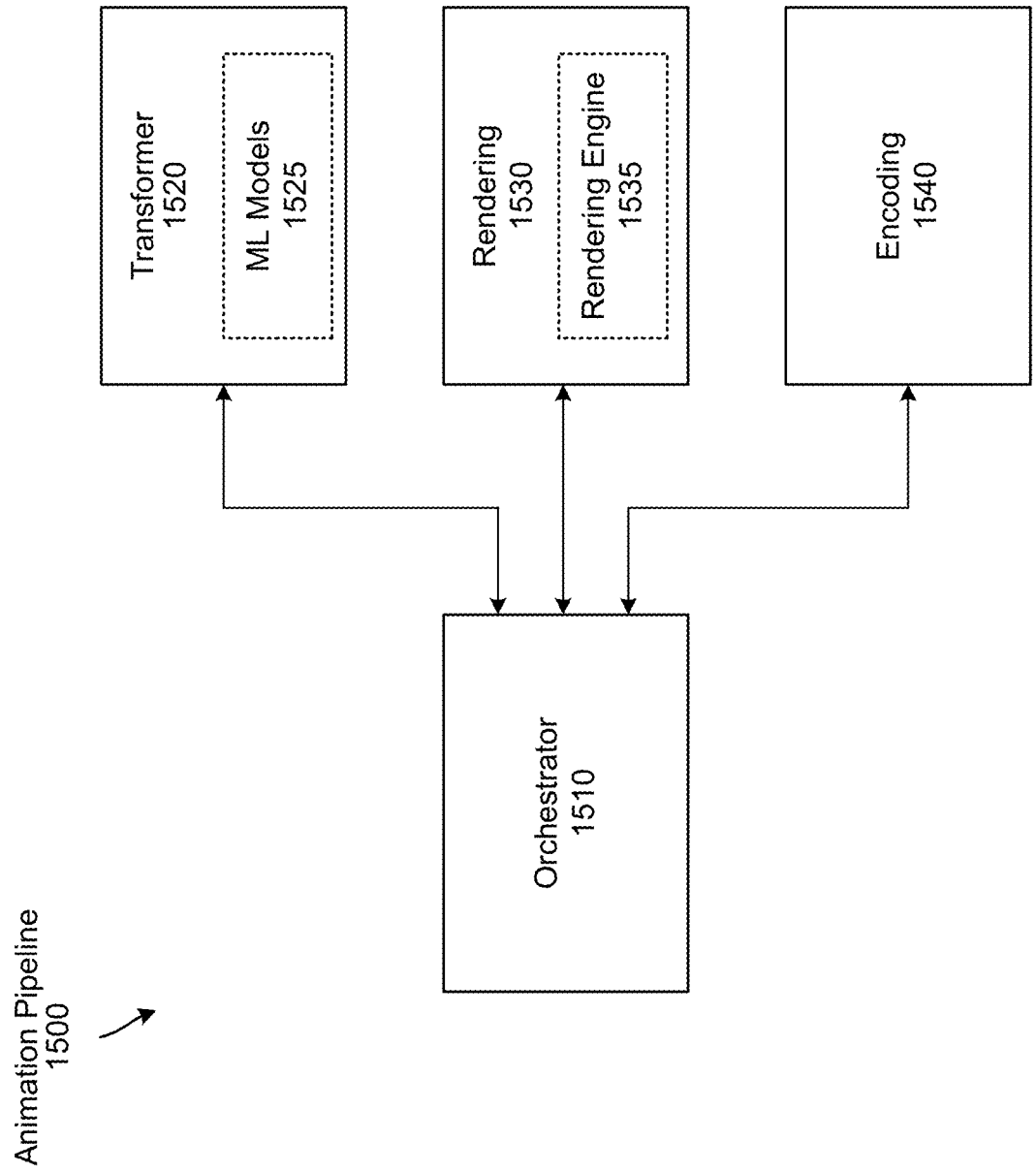

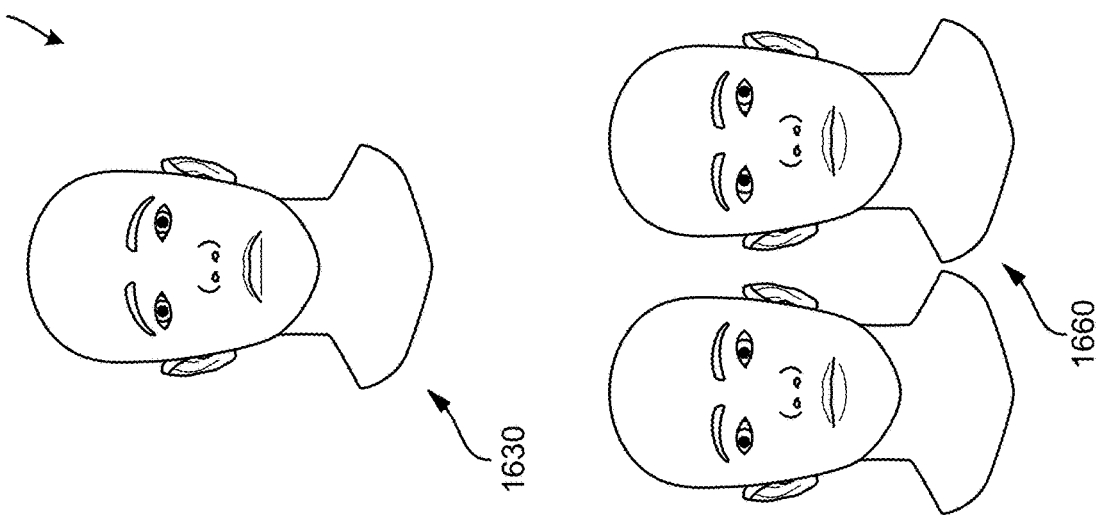
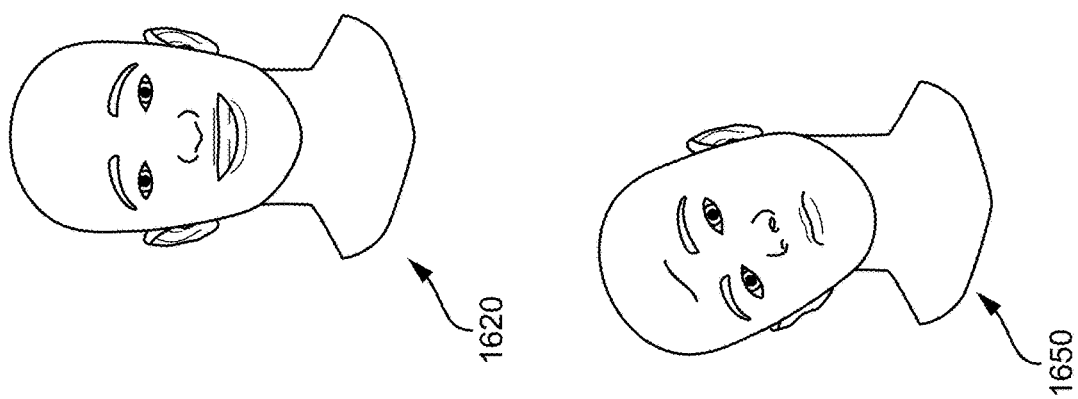
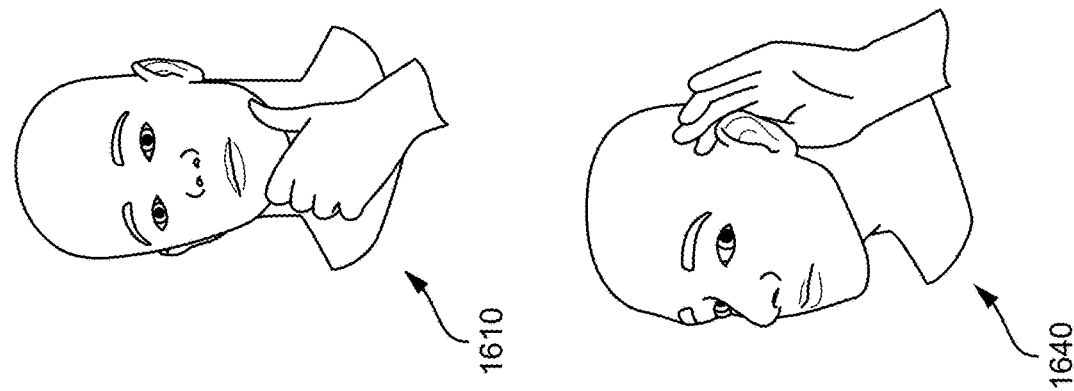
FIG. 16

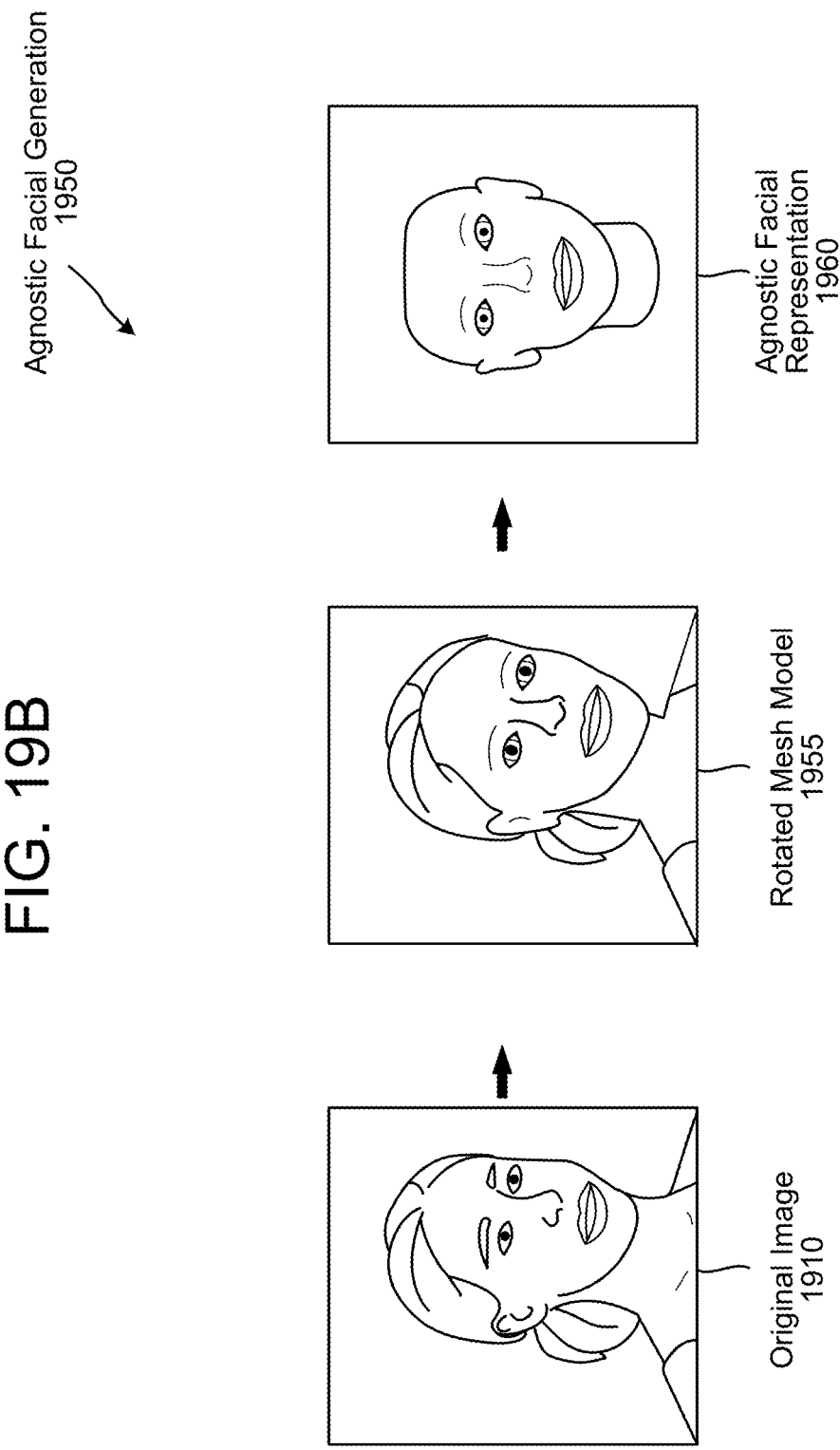

LISTENER ANIMATION

BACKGROUND

With the advancement of technology, the use and popularity of electronic devices has increased considerably. Electronic devices are commonly used to process and output audio data.

BRIEF DESCRIPTION OF DRAWINGS

For a more complete understanding of the present disclosure, reference is now made to the following description taken in conjunction with the accompanying drawings.

FIG. 1 illustrates a system for performing style-aware listener animation according to embodiments of the present disclosure.

FIG. 10 illustrates rendering examples according to embodiments of the present disclosure.

FIG. 15 illustrates an example of an animation pipeline according to embodiments of the present disclosure.

FIG. 16 illustrates examples of facial expressions according to embodiments of the present disclosure.

FIGS. 19A-19B are conceptual diagrams illustrating examples of generating mesh models representing facial animations according to embodiments of the present disclosure.

DETAILED DESCRIPTION

Figure 2:
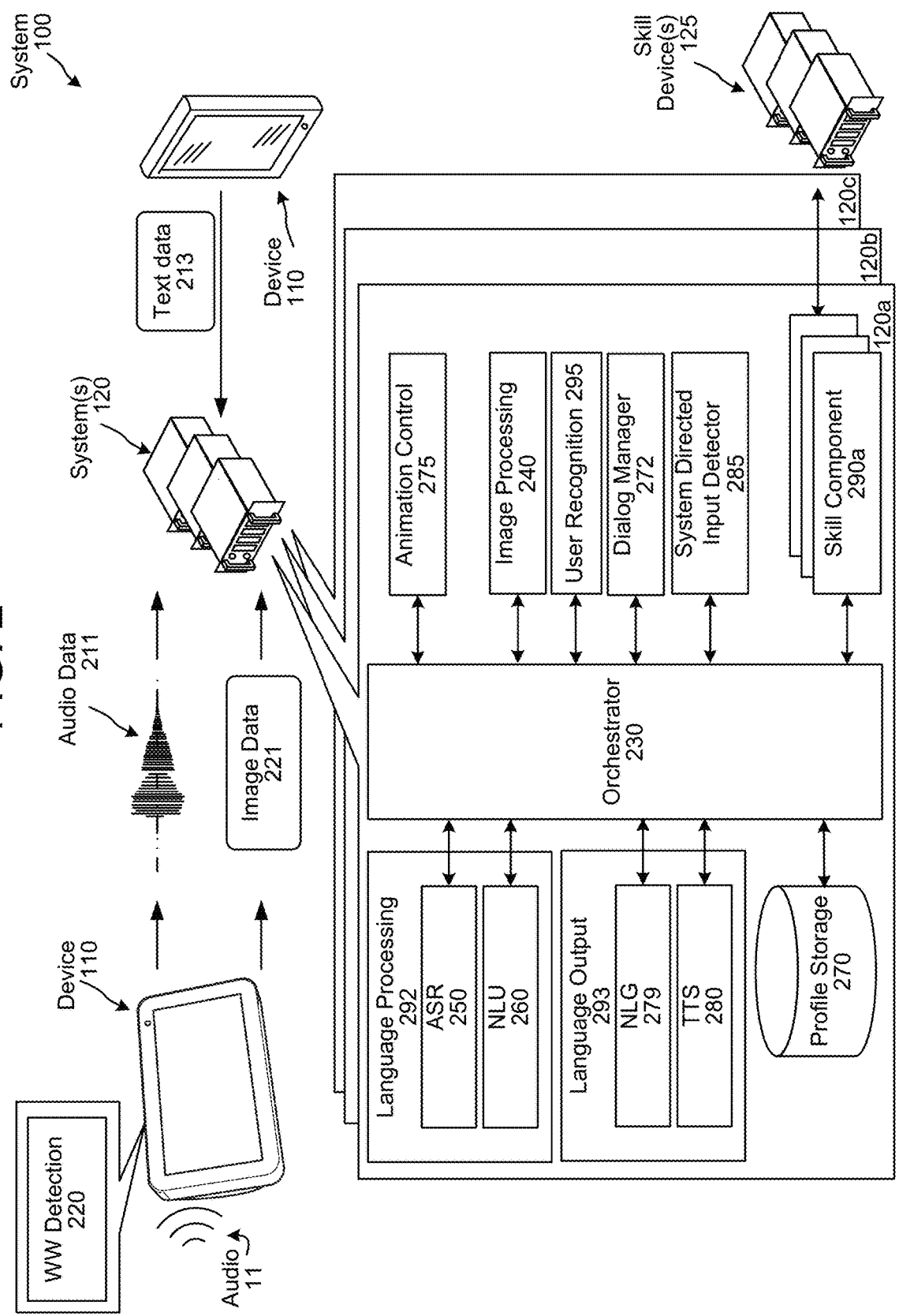
FIG. 2 is a conceptual diagram of components of the system, according to embodiments of the present disclosure.

Some electronic devices may include an audio-based input/output interface. A user may interact with such a device-which may be, for example, a smartphone, tablet, computer, or other speech-controlled device-partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. The device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

To improve a user experience and/or an interaction with the user, a system may be configured to enable listener animation to mimic listening behavior for a virtual assistant, virtual avatar, and/or the like. The animation may depend on a listening "style" that a virtual avatar may take on. Different listening styles (e.g., facial expressions and head poses) may be represented using an embedding space so that a single machine learning model can be trained to generate unique facial animations for a number of distinct listeners. Thus, individual listening styles can be associated with a listener identifier, enabling the system to (i) animate a plurality of different virtual listeners with unique nonverbal behavior and/or (ii) select a particular desired type of listener style with which to animate the virtual avatar. This enables the model to be generalized to new listeners to generate additional listener facial responses without needing training data for each new listener. In some examples, a second model can be trained to extract a listener representation style based on facial motion of an actual human listener. Thus, the first model may process the listener representation style, along with input data corresponding to a speaker talking, and generate unique facial animation responsive to the speech. In other examples, the first model can be trained to process the input data and a listener identifier to generate unique facial animation that is responsive to the speech and unique to the listener identifier.

FIG. 1 illustrates a system for performing style-aware listener animation according to embodiments of the present disclosure. As illustrated in FIG. 1, a system 100 may include a device 110 configured to perform style-aware listener animation to generate an animation while listening to a user 5. In some examples, the device 110 may communicate with one or more supporting device(s) 120, which may be server devices, via network(s) 199, which may be the Internet, a wide- or local-area network, and/or any other network, although the disclosure is not limited thereto.

The device 110 may receive audio corresponding to a spoken natural language input originating from the user 5. In some examples, the device 110 may process audio following detection of a wakeword. The device 110 may generate audio data 211 corresponding to the audio, and may send the audio data 211 to the supporting device(s) 120. The device 110 may send the audio data 211 to the supporting device(s) 120 via an application that is installed on the device 110 and associated with the supporting device(s) 120. An example of such an application is the Amazon Alexa application that may be installed on a smart phone, tablet, or the like. The device 110 may also receive output data from the supporting device(s) 120, and generate a synthesized speech output. The device 110 may include a camera for capturing image and/or video data for processing by the supporting device(s) 120, which is collectively referred to as image data 221.

Figure 23:
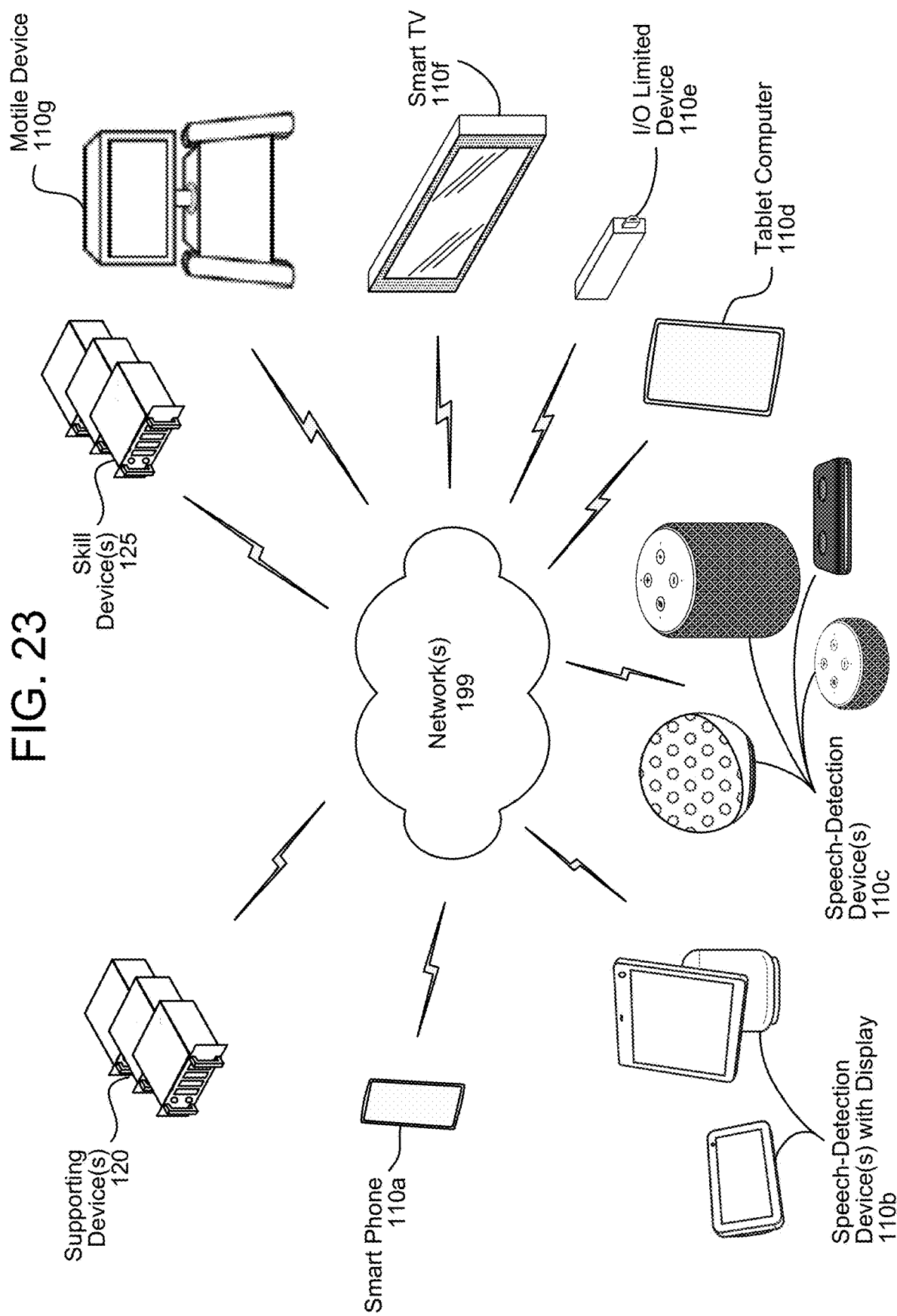
FIG. 23 illustrates an example of a computer network for use with the overall system, according to embodiments of the present disclosure.

Examples of various devices 110 are further illustrated in FIG. 23. The supporting device(s) 120 may be a group of computing components located geographically remote from device 110 but accessible via network 199 (for example, servers accessible via the internet). The supporting device(s) 120 may also be physically separate from device 110 but located geographically close to device 110 and accessible via network 199 (for example a home server located in a same residence as device 110. The supporting device(s) 120 may also include some combination thereof, for example where certain components/operations are performed via a home server(s) and others are performed via a geographically remote server(s).

During a dialog with the user, the device 110 may generate facial animation of a virtual avatar "listening" to the user. The animation may depend on a listening "style" that a virtual avatar may take on. Different listening styles (e.g., facial expressions and head poses) may be represented using an embedding space so that a single machine learning model can be trained to generate unique facial animations for a number of distinct listeners. Thus, individual listening styles can be associated with a listener identifier, enabling the system to (i) animate a plurality of different virtual listeners with unique nonverbal behavior and/or (ii) select a particular desired type of listener style with which to animate the virtual avatar. This enables the model to be generalized to new listeners to generate additional listener facial responses without needing training data for each new listener. In some examples, a second model can be trained to extract a listener representation style based on facial motion of an actual human listener. Thus, the first model may process the listener representation style, along with input data corresponding to a speaker talking, and generate unique facial animation responsive to the speech. In other examples, the first model can be trained to process the input data and a listener identifier to generate unique facial animation that is responsive to the speech and unique to the listener identifier.

As illustrated in FIG. 1, the device 110 may receive (130) first audio data representing speech of a user and may receive (132) first image data representing the user's face. For example, the device 110 may receive the first image data generated by a camera of the device 110. In some examples, the device 110 may determine (134) first motion data representing facial motion of the user's face using the first image data. For example, the device 110 may determine that the user's face is represented in a portion of the first image data and may process the portion of the first image data to determine motion data corresponding to facial expressions (e.g., facial expression parameters), although the disclosure is not limited thereto. In some examples, the system 100 may identify a plurality of landmarks (e.g., facial landmarks, body landmarks, and/or the like) corresponding to specific locations on the user's face and may extract the motion data by tracking changes to the landmarks over time, although the disclosure is not limited thereto.

The device 110 may process (136) the first audio data and the first motion data using a first model to determine first embedding data. When the device 110 determines that the user is speaking (e.g., detects an utterance) and that the utterance is directed at the device 110, the device 110 may operate in a listening mode. In some examples, the device 110 may select (138) a listener identifier and may process (140) the first embedding data and the listener identifier using a second model to generate first animation data. For example, a listener-aware animation model may process the first embedding data associated with the user to generate animation data responsive to the user.

The animation data may correspond to facial animations that mimic listening behavior of a virtual user (e.g., avatar), enabling the device 110 to generate a rendering of the virtual user listening to the user during a conversation. For example, the device 110 may generate (142) second image data using the first animation data and may present (144) the second image data on a display of the device 110.

The system 100 may use computer vision (CV) techniques (such as those described with regards to image processing component 240/340) operating on image data to perform listener-aware animation. The system 100 may thus use image data to determine when a user 5 is speaking and/or which user is speaking. The system 100 may use face detection techniques to detect a human face represented in image data. The system 100 may use a classifier or other model configured to determine whether a face is looking at a device 110. The system 100 may also be configured to track a face in image data to understand which faces in the video are belonging to the same person and where they may be located in image data and/or relative to a device 110. The system 100 may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement).

The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

To improve dialog processing, a system may be configured with a multi-user dialog (MUD) mode that allows the system to participate in a dialog with multiple users. As part of this mode (or operating in a normal mode using multi-user dialog components/operations) the system may be configured to identify when a user is speaking to the system and respond accordingly. The system may also be configured to identify when a user is speaking with another user and determine that such user-to-user speech does not require system action and so the system can ignore such speech. The system may also be configured to identify when a user is speaking with another user and determine when such user-to-user speech is relevant to the system such that it is appropriate for the system to interject or respond to the user-to-user speech with information that is relevant to the user, as if the system were a participant in a conversation. The system may also be configured to maintain a natural pace during a conversation and to insert conversational cues (such as "uh huh," "mm," or the like) to indicate to the user that the system is maintaining a connection with the user(s) for purposes in participating in the dialog. The system may use models configured to make such determinations based on audio data, image data showing the user(s) and other information. The system may also be configured to discontinue a multi-user dialog mode upon indication by the user, timeout, or other condition.

The system may also use CV techniques operating on image data (for example in a multi-user scenario) to determine whether a particular input (for example speech or a gesture) is device directed. The system may thus use image data to determine when a user is speaking to the system or to another user. The system may start conversing with one person, and switch to a second person when the second person gives a visual indication that they are about to talk to the system. Such a visual indication may include, for example, raising a hand, turning to look from another user to look at a device 110, or the like. To make such determinations the system may use face detection techniques to detect a human face represented in image data (for example using object detection component 530 as discussed below). The system may use a classifier or other model configured to determine whether a face is looking at a device 110 (for example using object tracking component 560 as discussed below). The system may also be configured to track a face in image data to understand which faces in the video are belonging to the same person and where they may be located in image data and/or relative to a device 110 (for example using user recognition component 295 and/or object tracking component 560 as discussed below). The system may also be configured to determine an active speaker, for example by determining which face(s) in image data belong to the same person and whether the person is speaking or not (for example using image data of a user's lips to see if they are moving and matching such image data to data regarding a user's voice and/or audio data of speech and whether the words of the speech match the lip movement). The system may use components such as user recognition component 295, object tracking component 560, and/or other components to perform such operations. To determine whether speech or another input is system directed, the system may use the above information as well as techniques described below in reference to system directed input detector 285/385 and FIG. 4.

Beamforming and/or other audio processing techniques may also be used to determine a voice's direction/distance relative to the device 110. Such audio processing techniques, in combination with image processing techniques may be used (along with user identification techniques or operations such as those discussed below) may be used to match a voice to a face and track a user's voice/face in an environment of the device 110 whether a user appears in image data (e.g., in the field of view of a camera 2118 of a device 110) or whether a user moves out of image data but is still detectable by the system 100 through audio data of the user's voice (or other data).

The system may also be configured to discern user-to-user speech and determine when it is appropriate for the system to interject and participate in such a conversation and when it is appropriate for the system to allow the users to converse without interjecting/participating. The system may be configured to provide personalized responses and proactively participate in a conversation, even when the system is not directly addressed. The system may determine (in natural turn taking mode) when users are talking to each other, determine whether these are simply sidebar conversations or if they are relevant to the ongoing conversation with the system (for example relevant to the subject of a system-involved dialog), and may proactively interject with helpful information that is personalized and directed to the user addressed by the system. Such operations may allow the system to function as an equal participant in a multi-party conversation. To allow for such operations the system may be configured for discourse understanding as part of NLU and dialog management as described below, for example in reference to NLU component 260 and dialog manager 272/372.

The system may also be configured to allow a natural pace during a conversation. The system may include component(s) to allow the system to "backchannel" during gaps in a conversation/dialog and to process breaks and turns within a conversation. For example, the system may be configured to encourage a user to continue speaking by insertion of turn holding cues such as uh, mm, or utterances that are pragmatically and syntactically incomplete followed by a silence. This allows the system to not interrupt a user's flow of the thought and gives the user sufficient time to respond. A classifier or other model may be configured to take into account turn holding cues as part of a spoken interaction between the system and a user. Such a classifier may be included in (and such operations may be managed by) one or more system components, for example dialog manager 272/372, language output component 293, or other component(s). The system may be configured to input audio data, image data, and other data to consider acoustic cues, prosody and other intonation classifications, as well as computer-vision features discussed herein. For example, if there is a silence that is classified as a pause, the system may returns an empty TTS response and continue to "listen." After an extended silence, the system may return uh huh, ok, hmm, right, yeah, etc. to encourage a user to continue talking. Such backchannel expressions the system's attention to the user without interruption of the user. For example when a user is adding elements to a list, the system may insert a backchannel indication in a gap after an utterance with the anticipation that more elements might get added by the user. This gives the customer more time while being reminded that the system is waiting and so encourages more participation from them or other parties in the conversation. The system may be trained to recognize such conversational components using simulated and model utterances which are syntactically and pragmatically incomplete. The system may also be trained using simulated syntactic incompleteness with utterances including pauses randomly included at the end of phrases within the utterance. The system may also be trained using simulated pragmatic incompleteness with utterances including pauses before all entities that are requested to be updated are provided.

The system 100 may operate using various components as described in FIG. 2. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 100. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 2118 of the device 110 and may send image data 221 representing those image(s) to the supporting device(s) 120. The image data 221 may include raw image data or image data processed by the device 110 before sending to the supporting device(s) 120. The image data 221 may also include individual still images and/or a video feed of multiple images.

The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by an input detector, the device 110 may "wake" and begin transmitting audio data 211, representing the audio 11, to the supporting device(s) 120. The audio data 211 may include data corresponding to the wakeword; in other embodiments, the portion of the audio corresponding to the wakeword is removed by the device 110 prior to sending the audio data 211 to the supporting device(s) 120. In the case of touch input detection or gesture based input detection, the audio data may not include a wakeword.

In some implementations, the system 100 may include more than one supporting device(s) 120. The systems 120 may respond to different wakewords and/or perform different categories of tasks. Each supporting device(s) 120 may be associated with its own wakeword such that speaking a certain wakeword results in audio data be sent to and processed by a particular system. For example, detection of the wakeword "Alexa" by the wakeword detector 220 may result in sending audio data to supporting device(s) 120a for processing while detection of the wakeword "Computer" by the wakeword detector may result in sending audio data to supporting device(s) 120*b* for processing. The system may have a separate wakeword and system for different skills (e.g., "Dungeon Master" for a game play skill/supporting device(s) 120*c*) and/or such skills may be coordinated by one or more skill(s) 290 of one or more supporting device(s) 120.

Upon receipt by the supporting device(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the supporting device(s) 120, a skill component 290, a skill system(s) 125, etc.) to execute the intent. For example, if the text data corresponds to "play the 5$^{th}$ Symphony by Beethoven," the NLU component 260 may determine an intent that the system output music and may identify "Beethoven" as an artist/composer and "5$^{th}$ Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora/a contextual reference such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

The NLU component 260 may return NLU results data 985/925 (which may include tagged text data, indicators of intent, etc.) back to the orchestrator 230. The orchestrator 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 985/925 includes an N-best list of NLU hypotheses, the NLU component 260 and the orchestrator component 230 may direct the top scoring NLU hypothesis to a skill component(s) 290 associated with the top scoring NLU hypothesis A skill component may be software running on the supporting device(s) 120 that is akin to a software application. That is, a skill component 290 may enable the supporting device(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The supporting device(s) 120 may be configured with more than one skill component 290. For example, a weather service skill component may enable the supporting device(s) 120 to provide weather information, a car service skill component may enable the supporting device(s) 120 to book a trip with respect to a taxi or ride sharing service, a restaurant skill component may enable the supporting device(s) 120 to order a pizza with respect to the restaurant's online ordering system, etc. A skill component 290 may operate in conjunction between the supporting device(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the supporting device(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the supporting device(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The supporting device(s) 120 may be configured with a skill component 290 dedicated to interacting with the skill support system(s) 125. Unless expressly stated otherwise, reference to a skill, skill device, or skill component may include a skill component 290 operated by the supporting device(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

The system(s) 100 may include a dialog manager component that manages and/or tracks a dialog between a user and a device. Management of the dialog may be performed by dialog manager 272/372. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component may associate a dialog session identifier with the dialog upon identifying that the user is engaging in a dialog with the user. The dialog manager component may track a user input and the corresponding system generated response to the user input as a turn. The dialog session identifier may correspond to multiple turns of user input and corresponding system generated response. The dialog manager component may transmit data identified by the dialog session identifier directly to the orchestrator component 230 or other component. Depending on system configuration the dialog manager may determine the appropriate system generated response to give to a particular utterance or user input of a turn. Or creation of the system generated response may be managed by another component of the system (e.g., the language output component 293, NLG 279, orchestrator 230, etc.) while the dialog manager selects the appropriate responses. Alternatively, another component of the supporting device(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager may receive the ASR hypothesis/hypotheses (i.e., text data) and make a semantic interpretation of the phrase(s) or statement(s) represented therein. That is, the dialog manager determines one or more meanings associated with the phrase(s) or statement(s) represented in the text data based on words represented in the text data. The dialog manager determines a goal corresponding to an action that a user desires be performed as well as pieces of the text data that allow a device (e.g., the device 110, the supporting device(s) 120, a skill 290, a skill system(s) 125, etc.) to execute the intent. If, for example, the text data corresponds to "what is the weather," the dialog manager may determine that that the supporting device(s) 120 is to output weather information associated with a geographic location of the device 110. In another example, if the text data corresponds to "turn off the lights," the dialog manager may determine that the supporting device(s) 120 is to turn off lights associated with the device(s) 110 or the user(s) 5.

The dialog manager may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

The supporting device(s) 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280. Alternatively or in addition, the TTS component 280 may receive text data from a skill 290 or other system component for output.

The NLG component 279 may include a trained model. The NLG component 279 generates text data from dialog data received by the dialog manager 272/273 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the supporting device(s) 120 as image data. The device 110 may further include circuitry for voice command-based control of the camera, allowing a user 5 to request capture of image or video data. The device 110 may process the commands locally or send audio data 211 representing the commands to the supporting device(s) 120 for processing, after which the supporting device(s) 120 may return output data that can cause the device 110 to engage its camera.

Upon receipt by the supporting device(s) 120, the image data 221 may be sent to an orchestrator component 230. The orchestrator component 230 may send the image data 221 to an image processing component 240. The image processing component 240 can perform computer vision functions such as object recognition, modeling, reconstruction, etc. For example, the image processing component 240 may detect a person, face, etc. (which may then be identified using user recognition component 295). The image processing component 240 is described in greater detail below with regard to FIG. 5. The device 110 may also include an image processing component 340 which operates similarly to image processing component 240.

In some implementations, the image processing component 240 can detect the presence of text in an image. In such implementations, the image processing component 240 can recognize the presence of text, convert the image data to text data, and send the resulting text data via the orchestrator component 230 to the language processing component 292 for processing by the NLU component 260.

The supporting device(s) 120 may include a user recognition component 295 that recognizes one or more users using a variety of data, as described in greater detail below with regard to FIGS. 21-22. However, the disclosure is not limited thereto, and the device 110 may include a user recognition component 395 instead of and/or in addition to user recognition component 295 of the supporting device(s) 120 without departing from the disclosure. User recognition component 395 operates similarly to user recognition component 295.

The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users assuming user permission and previous authorization. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may also be configured to determine (or assist another component in determining) that a particular voice matches a particular face for purposes of user identification and/or following a user in an environment if the user is not visible in image data).

Output of the user recognition component 295 may include a single user identifier corresponding to the most likely user that originated the user input. Alternatively, output of the user recognition component 295 may include an N-best list of user identifiers with respective scores indicating likelihoods of respective users originating the user input. The output of the user recognition component 295 may be used to inform NLU processing as well as processing performed by other components of the system.

The system 100 (either on device 110, supporting device(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various data (not illustrated separately) corresponding to a user/group of the profile. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the supporting device(s) 120 with permission to allow the skill to execute with respect to the user's natural language user inputs. If a user does not enable a skill, the supporting device(s) 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The animation control component 275 may be configured to perform animation using user preferences associated with a user profile. For example, the animation control component 275 may generate animations as described below with regard to FIGS. 12-20 without departing from the disclosure.

Figure 3:
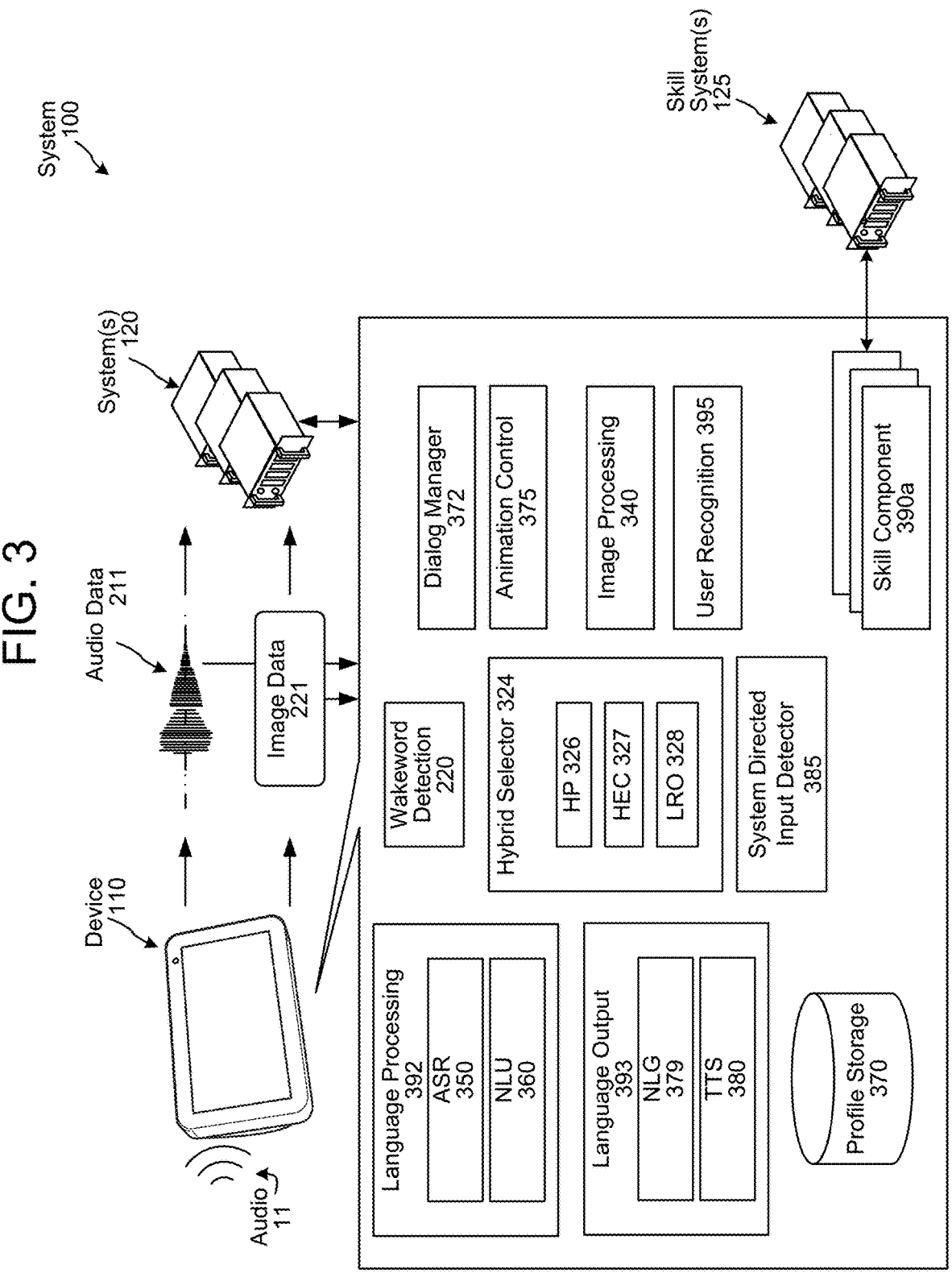
FIG. 3 is a conceptual diagram illustrating components that may be included in a device, according to embodiments of the present disclosure.

Although the components of FIG. 2 may be illustrated as part of supporting device(s) 120, device 110, or otherwise, the components may be arranged in other device(s) (such as in device 110 if illustrated in supporting device(s) 120 or vice-versa, or in other device(s) altogether) without departing from the disclosure. FIG. 3 illustrates such a configured device 110.

In at least some embodiments, the supporting device(s) 120 may receive the audio data 211 from the device 110, to recognize speech corresponding to a spoken input in the received audio data 211, and to perform functions in response to the recognized speech. In at least some embodiments, these functions involve sending directives (e.g., commands), from the supporting device(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the supporting device(s) 120 over the network(s) 199, some or all of the functions capable of being performed by the supporting device(s) 120 may be performed by sending one or more directives over the network(s) 199 to the device 110, which, in turn, may process the directive(s) and perform one or more corresponding actions. For example, the supporting device(s) 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the supporting device(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIGS. 2 and 3, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the supporting device(s) 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the supporting device(s) 120, and may prevent the ASR component 350 from further processing the audio data 211. In this situation, the audio data 211 can be discarded.

The device 110 may also include a system directed input detector 385. (The supporting device(s) 120 may also include a system directed input detector 285 which may operate in a manner similar to system directed input detector 385.) The system directed input detector 385 may be configured to determine whether an input to the system (for example speech, a gesture, etc.) is directed to the system or not directed to the system (for example directed to another user, etc.). The system directed input detector 385 may work in conjunction with the wakeword detector 220. If the system directed input detector 385 determines an input is directed to the system, the device 110 may "wake" and begin sending captured data for further processing (for example, processing audio data using the language processing 292/392, processing captured image data using image processing component 240/340 or the like). If data is being processed the device 110 may indicate such to the user, for example by activating or changing the color of an illuminated output (such as an LED ring), displaying an indicator on a display (such as a light bar across the display), outputting an audio indicator (such as a beep) or otherwise informing a user that input data is being processed. If the system directed input detector 385 determines an input is not directed to the system (such as a speech or gesture directed to another user) the device 110 may discard the data and take no further action for processing purposes. In this way the system 100 may prevent processing of data not directed to the system, thus protecting the users' privacy. As an indicator to the user, however, the system may output an audio, visual, or other indicator when the system directed input detector 385 is determining whether an input is potentially device directed. For example, the system may output an orange indicator while considering an input, and may output a green indicator if a system directed input is detected. Other such configurations are possible.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the supporting device(s) 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/120 (which may operate similarly to skill components 290), a user recognition component 395 (configured to process in a similar manner to that discussed herein with respect to the user recognition component 295 of the supporting device(s) 120), profile storage 370 (configured to store similar profile data to that discussed herein with respect to the profile storage 270 of the supporting device(s) 120), or other components. In at least some embodiments, the profile storage 370 may only store profile data for a user or group of users specifically associated with the device 110. Similar to as described above with respect to skill component 290, a skill component 390 may communicate with a skill system(s) 125. The device 110 may also have its own language output component 393 which may include NLG component 379 and TTS component 380. Language output component 393 may operate similarly to language output component 293, NLG component 379 may operate similarly to NLG component 279 and TTS component 380 may operate similarly to TTS component 280. The animation control component 375 may operate similarly to animation control component 275.

In at least some embodiments, the on-device language processing components may not have the same capabilities as the language processing components of the supporting device(s) 120. For example, the on-device language processing components may be configured to handle only a subset of the natural language user inputs that may be handled by the supporting device(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the supporting device(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the supporting device(s) 120.

The hybrid selector 324, of the device 110, may include a hybrid proxy (HP) 326 configured to proxy traffic to/from the supporting device(s) 120. For example, the HP 326 may be configured to send messages to/from a hybrid execution controller (HEC) 327 of the hybrid selector 324. For example, command/directive data received from the supporting device(s) 120 can be sent to the HEC 327 using the HP 326. The HP 326 may also be configured to allow the audio data 211 to pass to the supporting device(s) 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the supporting device(s) 120 and chooses to use that remotely-determined directive data.

Thus, when the audio data 211 is received, the HP 326 may allow the audio data 211 to pass through to the supporting device(s) 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the supporting device(s) 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the supporting device(s) 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the supporting device(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the supporting device(s) 120, assuming a remote response is even received (e.g., when the device 110 is able to access the supporting device(s) 120 over the network(s) 199), or to determine output audio requesting additional information from the user 5.

The device 110 and/or the supporting device(s) 120 may associate a unique identifier with each natural language user input. The device 110 may include the unique identifier when sending the audio data 211 to the supporting device(s) 120, and the response data from the supporting device(s) 120 may include the unique identifier to identify which natural language user input the response data corresponds.

In at least some embodiments, the device 110 may include, or be configured to use, one or more skill components 390 that may work similarly to the skill component(s) 290 implemented by the supporting device(s) 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125. Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 220 may result in sending audio data to certain language processing components 392/skills 390 for processing while detection of the wakeword "Computer" by the wakeword detector may result in sending audio data different language processing components 392/skills 390 for processing.

Figure 4:
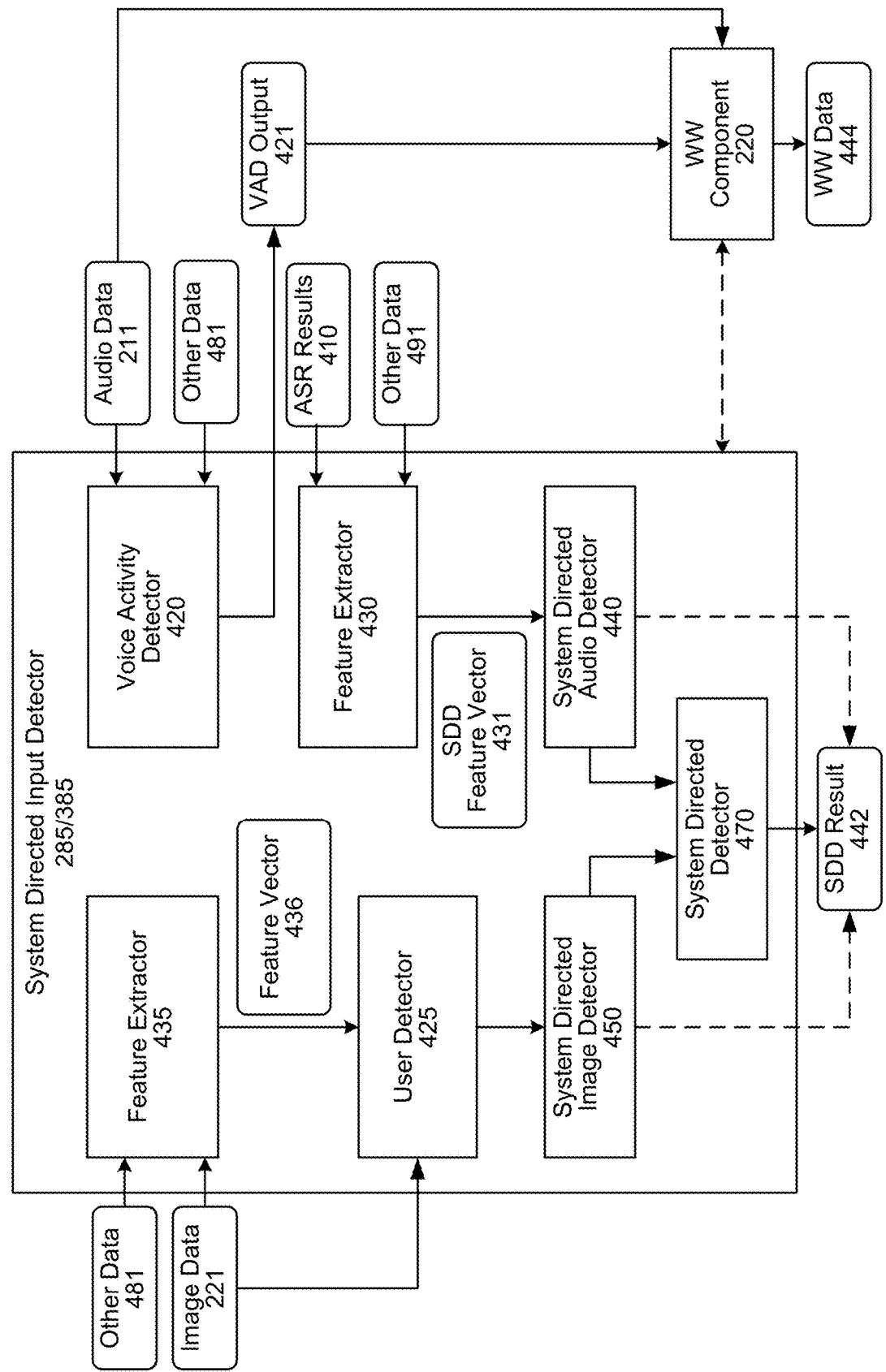
FIG. 4 is a conceptual diagram of components of a system to detect if input audio data includes system directed speech, according to embodiments of the present disclosure.

Configuration and operation of the system directed input detector 285/385 is illustrated in FIG. 4. As shown in FIG. 4, the system directed input detector 285/385 may include a number of different components. First, the system directed input detector 285/385 may include a voice activity detector (VAD) 420. The VAD 420 may operate to detect whether the incoming audio data 211 includes speech or not. The VAD output 421 may be a binary indicator. Thus, if the incoming audio data 211 includes speech, the VAD 420 may output an indicator 421 that the audio data 211 does includes speech (e.g., a 1) and if the incoming audio data 211 does not includes speech, the VAD 420 may output an indicator 421 that the audio data 211 does not includes speech (e.g., a 0). The VAD output 421 may also be a score (e.g., a number between 0 and 1) corresponding to a likelihood that the audio data 211 includes speech. The VAD 420 may also perform start-point detection as well as end-point detection where the VAD 420 determines when speech starts in the audio data 211 and when it ends in the audio data 211. Thus the VAD output 421 may also include indicators of a speech start point and/or a speech endpoint for use by other components of the system. (For example, the start-point and end-points may demarcate the audio data 211 that is sent to the speech processing component 240.) The VAD output 421 may be associated with a same unique ID as the audio data 211 for purposes of tracking system processing across various components.

The VAD 420 may operate using a variety of VAD techniques, including those described above with regard to VAD operations performed by device 110. The VAD may be configured to be robust to background noise so as to accurately detect when audio data actually includes speech or not. The VAD 420 may operate on raw audio data 211 such as that sent by device 110 or may operate on feature vectors or other data representing the audio data 211. For example, the VAD 420 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 420 may also operate on other data 481 that may be useful in detecting voice activity in the audio data 211. For example, the other data 481 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 420 that speech was detected. If not, that may be an indicator to the VAD 420 that speech was not detected. (For example, a representation may be taken of voice data in the first input audio data which may then be compared to the second input audio data to see if the voices match. If they do (or do not) that information may be considered by the VAD 420.) The VAD 420 may also consider other data when determining if speech was detected. The VAD 420 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 420 may also consider data regarding a previous utterance which may indicate whether the further audio data received by the system is likely to include speech. Other VAD techniques may also be used.

If the VAD output 421 indicates that no speech was detected the system (through orchestrator 230 or some other component) may discontinue processing with regard to the audio data 211, thus saving computing resources that might otherwise have been spent on other processes (e.g., ASR for the audio data 211, etc.). If the VAD output 421 indicates that speech was detected, the system may make a determination as to whether the speech was or was not directed to the speech-processing system. Such a determination may be made by the system directed audio detector 440. The system directed audio detector 440 may include a trained model, such as a DNN, that operates on a feature vector which represent certain data that may be useful in determining whether or not speech is directed to the system. To create the feature vector operable by the system directed audio detector 440, a feature extractor 430 may be used. The feature extractor 430 may input ASR results 410 which include results from the processing of the audio data 211 by a speech recognition component.

For privacy protection purposes, in certain configurations the ASR results 410 may be obtained from a language processing component 392/ASR component 350 located on device 110 or on a home remote component as opposed to a language processing component 292/ASR component 250 located on a cloud or other remote supporting device(s) 120 so that audio data 211 is not sent remote from the user's home unless the system directed input detector 385 has determined that the input is system directed. Though this may be adjusted depending on user preferences/system configuration.

The ASR results 410 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 410 may include a trellis, which may include a raw search graph as scored during ASR decoding. The ASR results 410 may also include a lattice, which may be a trellis as scored that has been pruned to remove certain hypotheses that do not exceed a score threshold or number of hypotheses threshold. The ASR results 410 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 410 may also include corresponding respective scores (such as for a trellis, lattice, confusion network, individual hypothesis, N-best list, etc.)

The ASR results 410 (or other data 491) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250 being less confident about its best hypothesis, which in turn may correlate to detected speech not being device directed. The entropy may be a feature included in other data 491 to be considered by the system directed audio detector 440.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 250 is less confident about the top hypothesis, which may correlate to detected speech not being device directed. Other such features or data from the ASR results 410 may also be used as other data 491.

The ASR results 410 may be represented in a system directed detector (SDD) feature vector 431 that can be used to determine whether speech was system-directed. The feature vector 431 may represent the ASR results 410 but may also represent audio data 211 (which may be input to feature extractor 430) or other information. Such ASR results may be helpful in determining if speech was system-directed. For example, if ASR results include a high scoring single hypothesis, that may indicate that the speech represented in the audio data 211 is directed at, and intended for, the device 110. If, however, ASR results do not include a single high scoring hypothesis, but rather many lower scoring hypotheses, that may indicate some confusion on the part of the speech recognition component 250 and may also indicate that the speech represented in the audio data 211 was not directed at, nor intended for, the device 110.

The ASR results 410 may include complete ASR results, for example ASR results corresponding to all speech between a startpoint and endpoint (such as a complete lattice, etc.). In this configuration the system may wait until all ASR processing for a certain input audio has been completed before operating the feature extractor 430 and system directed audio detector 440. Thus the system directed audio detector 440 may receive a feature vector 431 that includes all the representations of the audio data 211 created by the feature extractor 430. The system directed audio detector 440 may then operate a trained model (such as a DNN) on the feature vector 431 to determine a score corresponding to a likelihood that the audio data 211 includes a representation of system-directed speech. If the score is above a threshold, the system directed audio detector 440 may determine that the audio data 211 does include a representation of system-directed speech. The SDD result 442 may include an indicator of whether the audio data includes system-directed speech, a score, and/or some other data.

The ASR results 410 may also include incomplete ASR results, for example ASR results corresponding to only some speech between a between a startpoint and endpoint (such as an incomplete lattice, etc.). In this configuration the feature extractor 430/system directed audio detector 440 may be configured to operate on incomplete ASR results 410 and thus the system directed audio detector 440 may be configured to output an SSD result 442 that provides an indication as to whether the portion of audio data processed (that corresponds to the incomplete ASR results) corresponds to system directed speech. The system may thus be configured to perform ASR at least partially in parallel with the system directed audio detector 440 to process ASR result data as it is ready and thus continually update an SDD result 442. Once the system directed input detector 285/385 has processed enough ASR results and/or the SDD result 442 exceeds a threshold, the system may determine that the audio data 211 includes system-directed speech. Similarly, once the system directed input detector 285/385 has processed enough ASR results and/or the SDD result 442 drops below another threshold, the system may determine that the audio data 211 does not include system-directed speech.

The SDD result 442 may be associated with a same unique ID as the audio data 211 and VAD output 421 for purposes of tracking system processing across various components.

The feature extractor 430 may also incorporate in a feature vector 431 representations of other data 491. Other data 491 may include, for example, word embeddings from words output by the speech recognition component may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 430 processing and representing a word embedding in a feature vector 431 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 491 may also include, for example, NLU output from the natural language 260 component may be considered. Thus, if natural language output data 1585/1525 indicates a high correlation between the audio data 211 and an out-of-domain indication (e.g., no intent classifier scores from ICs or overall domain scores from recognizers reach a certain confidence threshold), this may indicate that the audio data 211 does not include system-directed speech. Other data 491 may also include, for example, an indicator of a user/speaker as output user recognition component 295. Thus, for example, if the user recognition component 295 does not indicate the presence of a known user, or indicates the presence of a user associated with audio data 211 that was not associated with a previous utterance, this may indicate that the audio data 211 does not include system-directed speech. The other data 491 may also include an indication that a voice represented in audio data 211 is the same (or different) as the voice detected in previous input audio data corresponding to a previous utterance. The other data 491 may also include directionality data, for example using beamforming or other audio processing techniques to determine a direction/location of a source of detected speech and whether that source direction/location matches a speaking user. The other data 491 may also include data indicating that a direction of a user's speech is toward a device 110 or away from a device 110, which may indicate whether the speech was system directed or not.

Other data 491 may also include image data 221. For example, if image data is detected from one or more devices that are nearby to the device 110 (which may include the device 110 itself) that captured the audio data being processed using the system directed input detector (285/385), the image data may be processed to determine whether a user is facing an audio capture device for purposes of determining whether speech is system-directed as further explained below.

Other data 491 may also dialog history data. For example, the other data 491 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 491 may also include an indicator as to whether the audio data 211 was received as a result of a wake command or whether the audio data 211 was sent without the device 110 detecting a wake command (e.g., the device 110 being instructed by supporting device(s) 120 and/or determining to send the audio data without first detecting a wake command).

Other data 491 may also include information from the user profile 270.

Other data 491 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 491 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 491 may also include an indicator that indicates whether the audio data 211 includes a wakeword. For example, if a device 110 detects a wakeword prior to sending the audio data 211 to the supporting device(s) 120, the device 110 may send along an indicator that the device 110 detected a wakeword in the audio data 211. In another example, the supporting device(s) 120 may include another component that processes incoming audio data 211 to determine if it includes a wakeword. If it does, the component may create an indicator indicating that the audio data 211 includes a wakeword. The indicator may then be included in other data 491 to be incorporated in the feature vector 431 and/or otherwise considered by the system directed audio detector 440.

Other data 491 may also include device history data such as information about previous operations related to the device 110 that sent the audio data 211. For example, the other data 491 may include information about a previous utterance that was just executed, where the utterance originated with the same device 110 as a current utterance and the previous utterance was within a certain time window of the current utterance. Device history data may be stored in a manner associated with the device identifier (which may also be included in other data 491), which may also be used to track other information about the device, such as device hardware, capability, location, etc.

The other data 481 used by the VAD 420 may include similar data and/or different data from the other data 491 used by the feature extractor 430. The other data 481/491 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 440 and/or the VAD 420) may be based on the data from the previous utterance. For example, a score threshold (for the system directed audio detector 440 and/or the VAD 420) may be based on acoustic data from a previous utterance.

The feature extractor 430 may output a single feature vector 431 for one utterance/instance of input audio data 211. The feature vector 431 may consistently be a fixed length, or may be a variable length vector depending on the relevant data available for particular audio data 211. Thus, the system directed audio detector 440 may output a single SDD result 442 per utterance/instance of input audio data 211. The SDD result 442 may be a binary indicator. Thus, if the incoming audio data 211 includes system-directed speech, the system directed audio detector 440 may output an indicator 442 that the audio data 211 does includes system-directed speech (e.g., a 1) and if the incoming audio data 211 does not includes system-directed speech, the system directed audio detector 440 may output an indicator 442 that the audio data 211 does not system-directed includes speech (e.g., a 0). The SDD result 442 may also be a score (e.g., a number between 0 and 1) corresponding to a likelihood that the audio data 211 includes system-directed speech. Although not illustrated in FIG. 4, the flow of data to and from the system directed input detector 285/385 may be managed by the orchestrator 230 or by one or more other components.

The trained model(s) of the system directed audio detector 440 may be trained on many different examples of SDD feature vectors that include both positive and negative training samples (e.g., samples that both represent system-directed speech and non-system directed speech) so that the DNN and/or other trained model of the system directed audio detector 440 may be capable of robustly detecting when speech is system-directed versus when speech is not system-directed.

A further input to the system directed input detector 285/385 may include output data from TTS component 280 to avoid synthesized speech output by the system being confused as system-directed speech spoken by a user. The output from the TTS component 280 may allow the system to ignore synthesized speech in its considerations of whether speech was system directed. The output from the TTS component 280 may also allow the system to determine whether a user captured utterance is responsive to the TTS output, thus improving system operation.

The system directed input detector 285/385 may also use echo return loss enhancement (ERLE) and/or acoustic echo cancellation (AEC) data to avoid processing of audio data generated by the system.

As shown in FIG. 4, the system directed input detector 285/385 may simply user audio data to determine whether an input is system directed (for example, system directed audio detector 440 may output an SDD result 442). This may be true particularly when no image data is available (for example for a device without a camera). If image data 221 is available, however, the system may also be configured to use image data 221 to determine if an input is system directed. The image data 221 may include image data captured by device 110 and/or image data captured by other device(s) 110 in the environment of device 110. The audio data 211, image data 221 and other data 481 may be timestamped or otherwise correlated so that the system directed input detector 285/385 may determine that the data being analyzed all relates to a same time window so as to ensure alignment of data considered with regard to whether a particular input is system directed. For example, the system directed input detector 285/385 may determine system directedness scores for every frame of audio data/every image of a video stream and may align and/or window them to determine a single overall score for a particular input that corresponds to a group of audio frames/images.

Image data 221 along with other data 481 may be received by feature extractor 435. The feature extractor may create one or more feature vectors 436 which may represent the image data 221/other data 481. In certain examples, other data 481 may include data from image processing component 240 which may include information about faces, gesture, etc. detected in the image data 221. For privacy protection purposes, in certain configurations any image processing/results thereof may be obtained from an image processing component 340 located on device 110 or on a home remote component as opposed to a image processing component 240 located on a cloud or other supporting device(s) 120 so that image data 221 is not sent remote from the user's home unless the system directed input detector 385 has determined that the input is system directed. Though this may be adjusted depending on user preferences/system configuration.

The feature vector 436 may be passed to the user detector 425. The user detector 425 (which may use various components/operations of image processing component 240, user recognition component 295, etc.) may be configured to process image data 221 and/or feature vector 436 to determine information about the user's behavior which in turn may be used to determine if an input is system directed. For example, the user detector 425 may be configured to determine the user's position/behavior with respect to device 110/system 100. The user detector 425 may also be configured to determine whether a user's mouth is opening/closing in a manner that suggests the user is speaking. The user detector 425 may also be configured to determine whether a user is nodding or shaking his/her head. The user detector 425 may also be configured to determine whether a user's gaze is directed to the device 110, to another user, or to another object. For example, the use detector 425 may include, or be configured to use data from, a gaze detector 565. The user detector 425 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 425 may also be configured to determine a user's position/orientation such as facing another user, facing the device 110, whether their back is turned, etc. The user detector 425 may also be configured to determine relative positions of multiple users that appear in image data (and/or are speaking in audio data 211 which may also be considered by the user detector 425 along with feature vector 431), for example which users are closer to a device 110 and which are farther away. The user detector 425 (and/or other component) may also be configured to identify other objects represented in image data and determine whether objects are relevant to a dialog or system interaction (for example determining if a user is referring to an object through a movement or speech).

The user detector 425 may operate one or more models (e.g., one or more classifiers) to determine if certain situations are represented in the image data 221. For example the user detector 425 may employ a visual directedness classifier that may determine, for each face detected in the image data 221 whether that face is looking at the device 110 or not. For example, a light-weight convolutional neural network (CNN) may be used which takes a face image cropped from the result of the face detector as input and output a [0, 1] score of how likely the face is directed to the camera or not. Another technique may include to determine a three-dimensional (3D) landmark of each face, estimate the 3D angle of the face and predict a directness score based on the 3D angle.

The user detector 425 (or other component(s) such as those in image processing 240) may be configured to track a face in image data to determine which faces represented may belong to a same person. The system may user IOU based tracker, a mean-shift based tracker, a particle filter based tracker or other technique.

The user detector 425 (or other component(s) such as those in user recognition component 295) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 450 may then determine, based on information from the user detector 425, such as the image data 221, whether an input relating to the image data 221 is system directed. The system directed image detector 450 may also operate on other input data, for example image data including raw image data 221, image data including feature vector data 436 based on raw image data, other data 481, or other data. The determination by the system directed image detector 450 may result in a score indicating whether the input is system directed based on the image data. If no audio data is available, the indication may be output as SDD result 442. If audio data is available, the indication may be sent to system directed detector 470 which may consider information from both system directed audio detector 440 and system directed image detector 450. The system directed detector 470 may then process the data from both system directed audio detector 440 and system directed image detector 450 to come up with an overall determination as to whether an input was system directed, which may be output as SDD result 442. The system directed detector 470 may consider not only data output from system directed audio detector 440 and system directed image detector 450 but also other data/metadata corresponding to the input (for example, image data/feature data 436, audio data/feature data 431, image data 221, audio data 211, or the like discussed with regard to FIG. 4. The system directed detector 470 may include one or more models which may analyze the various input data to make a determination regarding SDD result 442.

In one example the determination of the system directed detector 470 may be based on "AND" logic, for example determining an input is system directed only if affirmative data is received from both system directed audio detector 440 and system directed image detector 450. In another example the determination of the system directed detector 470 may be based on "OR" logic, for example determining an input is system directed if affirmative data is received from either system directed audio detector 440 or system directed image detector 450. In another example the data received from system directed audio detector 440 and system directed image detector 450 are weighted individually based on other information available to system directed detector 470 to determine to what extend audio and/or image data should impact the decision of whether an input is system directed.

The system directed input detector 285/385 may also receive information from a wakeword component 220. For example, an indication that a wakeword was detected (e.g., WW data 444) may be considered by the system directed input detector 285/385 (e.g., by system directed audio detector 440, system directed detector 470, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 292). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 211 or image data 221) sent to supporting device(s) 120 that are outside a user's home or other direct control.

Figure 5:
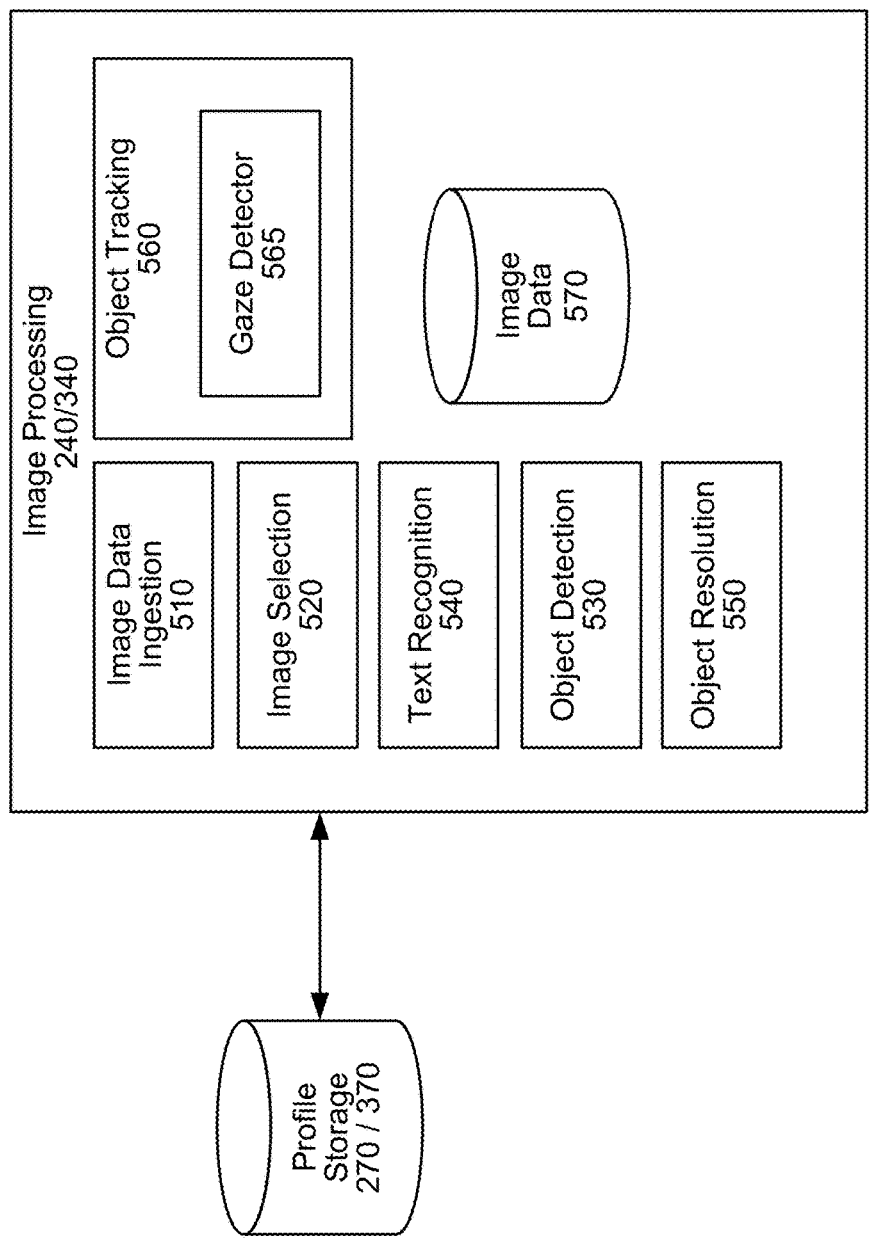
FIG. 5 is a conceptual diagram of components of an image processing component, according to embodiments of the present disclosure.

As shown in FIG. 5, the supporting device(s) 120 may include image processing component 240. The image processing component 240 may located across different physical and/or virtual machines. The image processing component 240 may receive and analyze image data (which may include single images or a plurality of images such as in a video feed). The image processing component 240 may work with other components of the supporting device(s) 120 to perform various operations. For example the image processing component 240 may work with user recognition component 295 to assist with user recognition using image data. The image processing component 240 may also include or otherwise be associated with image data storage 570 which may store aspects of image data used by image processing component 240. The image data may be of different formats such as JPEG, GIF, BMP, MPEG, video formats, and the like.

Image matching algorithms, such as those used by image processing component 240, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 570, profile storage 270, or other storage component.

Image selection component 520 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 240 may be configured to select or discard an image quickly so that the system can, in turn, quickly process the selected image and deliver results to a user. The image selection component 520 may select an image for object recognition by computing a metric/feature for each frame in the video feed and selecting an image for processing if the metric exceeds a certain threshold. While FIG. 5 illustrates image selection component 520 as part of supporting device(s) 120, it may also be located on device 110 so that the device may select only desired image(s) to send to supporting device(s) 120, thus avoiding sending too much image data to supporting device(s) 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 520 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 520 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter) 2), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter) 2), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 520 for sending to another component (e.g., from device 110 to supporting device(s) 120) and/or for further processing, such as text recognition, object detection/resolution, etc.

The feature data calculated by image selection component 520 may be sent to other components such as text recognition component 540, objection detection component 530, object resolution component 550, etc. so that those components may use the feature data in their operations. Other preprocessing operations such as masking, binarization, etc. may be performed on image data prior to recognition/resolution operations. Those preprocessing operations may be performed by the device prior to sending image data or by supporting device(s) 120.

Object detection component 530 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 530 may process at least a portion of the image data to determine feature data. The feature data is indicative of one or more features that are depicted in the image data. For example, the features may be face data, or other objects, for example as represented by stored data in profile storage 270. Other examples of features may include shapes of body parts or other such features that identify the presence of a human. Other examples of features may include edges of doors, shadows on the wall, texture on the walls, portions of artwork in the environment, and so forth to identify a space. The object detection component 530 may compare detected features to stored data (e.g., in profile storage 270, image data 570, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 530 the system may determine which object is actually seen using object resolution component 550. Thus one component, such as object detection component 530, may detect if an object is represented in an image while another component, object resolution component 550 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 530 may determine that a type of object is represented in image data and object resolution component 550 may then determine which specific object is represented. The object resolution component 550 may also make available specific data about a recognized object to further components so that further operations may be performed with regard to the resolved object.

Object detection component 530 may be configured to process image data to detect a representation of an approximately two-dimensional (2D) object (such as a piece of paper) or a three-dimensional (3D) object (such as a face). Such recognition may be based on available stored data (e.g., 270, 570, etc.) which in turn may have been provided through an image data ingestion process managed by image data ingestion component 510. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component 530 may be configured to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space"

is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNOW). A variation of neural networks are deep belief networks (DBNs) which use unsupervised pre-training to generate a neural network to first learn useful features, and training the DBN further by back-propagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

After at least a portion of a user has been detected in image data captured by a computing device, approaches in accordance with various embodiments track the detected portion of the user, for example using object tracking component 560. The object tracking component 560, gaze detector 565, or other component(s), may use user recognition data 295 or other information related to the user recognition component to identify and/or track a user using image data. FIGS. 6A-6F illustrate certain approaches that can be utilized for detecting and tracking a user's face in accordance with various embodiments. FIG. 6A illustrates an example wherein the approximate position and orientation of the head of a user 602 has been determined and a virtual "box" 620 is placed around the user's head using one or more of the various user detection processes discussed herein. A similar or different approach can also be used to determine an approximate location and area 622 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device and that the user is looking at the device. Further, the relative movement of the user's eyes and mouth can be easier to detect than the overall movement of the user's face when the user is performing motions such as nodding or shaking the head back and forth.

Various other approaches can also be used to track the user. For example, FIG. 6B illustrates an example wherein various features on a user's face are identified and assigned a point 624 in the image. The system thus can detect various aspects of user facial features and can determine changes such as movement or change in shape or expression. Such an approach can provide advantages over the general approach of FIG. 6A in certain situations, as various points along a facial feature can be determined, such as the end points and at least one center point of a user's mouth. Accordingly, expressions such as a smile or frown can be captured even though the overall position of the user's mouth or face did not move.

Once the facial features of a user are detected, relative motion or changes in facial expression can be tracked and utilized as input in accordance with various embodiments. For example, FIG. 6C illustrates an example where the user's head 602 is moving up and down with respect to the viewable area of the imaging element. As discussed, this could be the result of the user shaking his or her head, or the user moving the device up and down, etc. FIG. 6D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 6E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 6F:
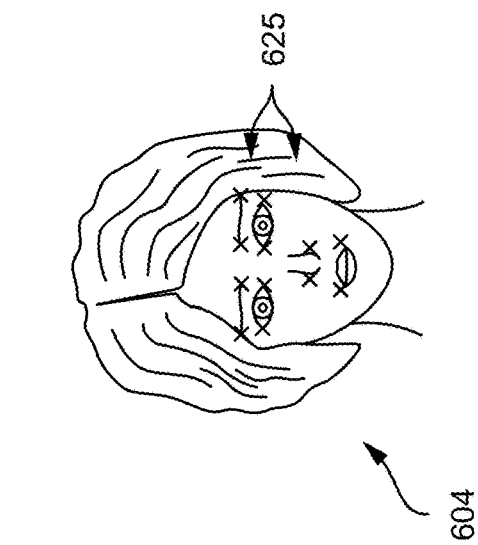
FIGS. 6A-6F illustrate examples of tracking a user's face in image data in accordance various embodiments.
Figure 6C:
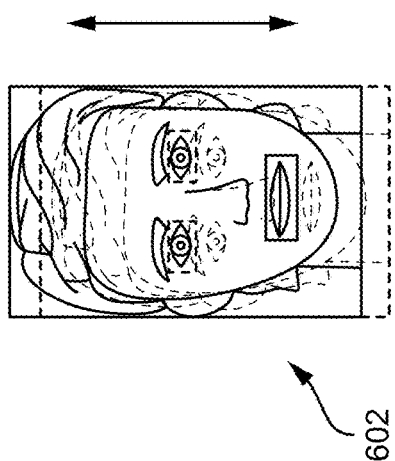
Figure 6E:
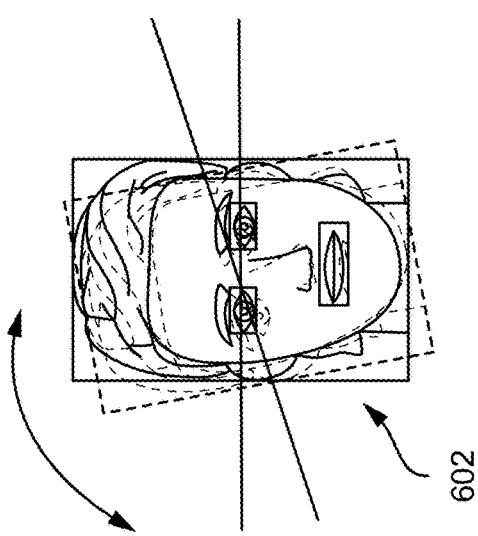
Figure 6B:
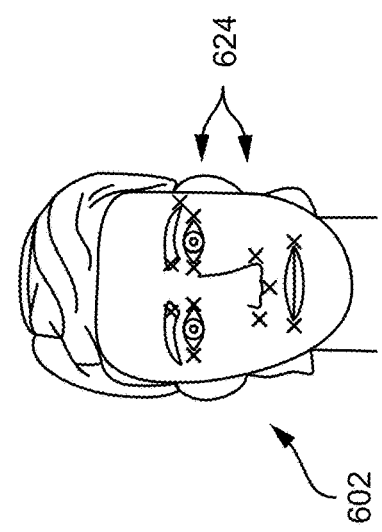
Figure 6D:
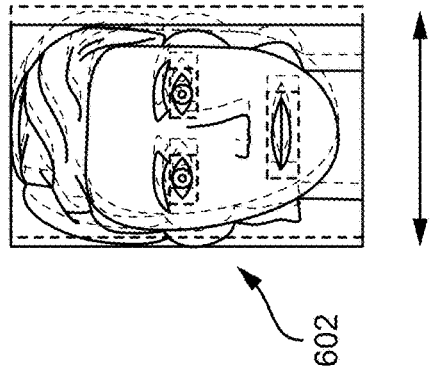
Figure 6A:
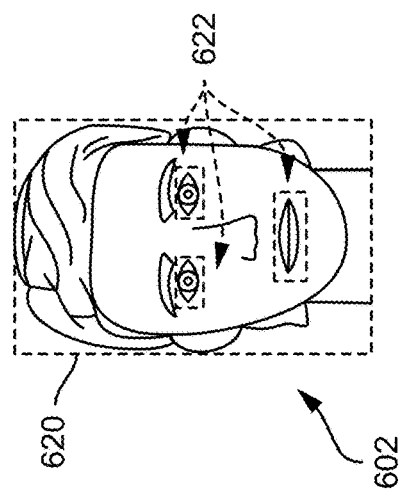

FIG. 6F illustrates another advantage of using an approach such as that described with respect to FIG. 6B to determine the position of various features on a user's face. In this example, it can be seen that the features of a head of a second user 604 have a different relative position and separation. Thus, a computing device also can not only determine positions and changes of facial features for a specific user, but can distinguish between different users. Also, the device can be configured to detect how close a user is to the device based on, for example, the amount and ratio of separation of various features 625, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Object tracking component 560 may also track other objects represented in image data. An object identified in image data (for example by object detection component 530) may appear in different position(s) in image data captured by a camera of device 110. Object tracking component 560 may track the object across image data and may (along with other component(s) of the system) attempt to determine a relative position of the object to the device 110 (or other reference point) over time using various techniques.

Object tracking component 560 may also include a gaze detection component 565. The gaze detection component 565 may also be located elsewhere in the system design. The gaze detection component 565 may include a classifier or other component (for example including one or more trained model(s)) that is configured to track the gaze of a user using image data and/or feature data corresponding to image data. The gaze detection component 565 may output data indicating that a user is looking at a device or looking elsewhere (for example at another user). If operated on device 110, the gaze detection component 565 may process image data (which may including raw image data captured by a camera or may include feature data representing raw image data) to determine that the user is gazing at a camera of the device. If operated on another device, the gaze detection component 565 may process image data to determine a user is looking at device 110, for example looking at device 110 while speaking an utterance. In this manner processing by a second device may be used to determine that a user is looking at a first device while speaking to the first device. Thus, for example, in a smart-home situation image data from a camera removed from a speech-capture device (e.g., device 110) may be used to determine a user was looking at the speech-capture device when speaking. Data from the gaze detector 565 may be used, for example, by system directed input detector 385.

Figure 7:
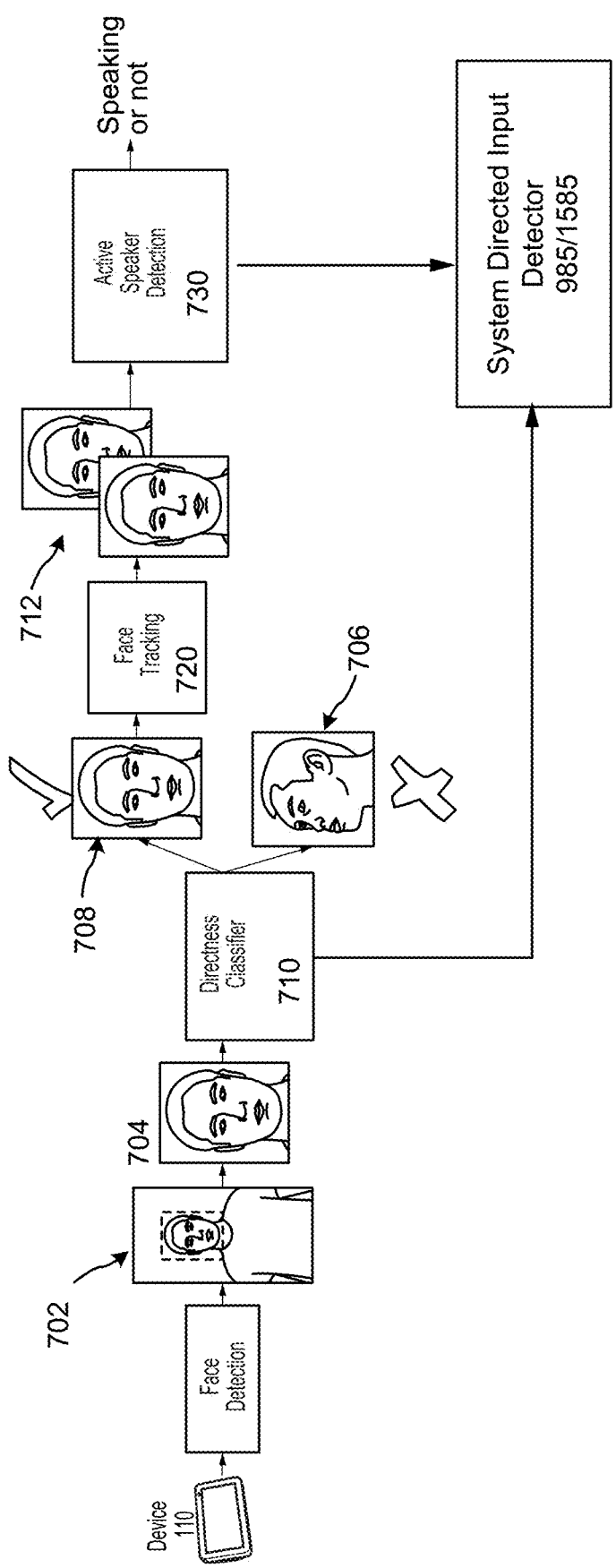
FIG. 7 illustrates techniques for using image data to determine whether an input is system directed, according to embodiments of the present disclosure.

FIG. 7 illustrates techniques for using image data to determine whether an input is system directed, according to embodiments of the present disclosure. As illustrated in FIG. 7, the device 110 may receive image data 221 from one or more camera(s) 2118 and may use a face detection algorithm (executed, for example, by object detection component 530) to identify a face in image data, as shown by bounded face 702. The device 110 may then isolate the image data 704 of the face and process that image data using a directness classifier 710 (for example as executed by object tracking component 560 and/or user detector 425) to determine if the user's gaze is directed to the device or elsewhere. If the user is not looking at the device (e.g., as shown in image 706) then the system may determine that user's gaze is directed elsewhere and the appropriate component may output data accordingly. If the user is looking at the device (e.g., as shown in image 708) then the system may determine that user's gaze is directed at the device and may commence tracking the user's face using a face tracking component 720 (for example as part of object tracking component 560). The system may then refer to a series of images 712 of the same face and process related image data by an active speaker detection component 730 (for example as part of user detector 425) to determine if the face represented in image data 221/704/708 is speaking. Data output by the directness classifier 710 and active speaker detection component 730 may be sent to the system directed image detector 450 and/or system directed detector 470 to determine if an input is system directed.

The user detector 425 may thus output one or more scores or other data indicating user behavior or other data determined from the image data and pass that data to system directed image detector 450. For example, the user detector 425 may pass a variety of scores representing the image data, such as:

<Face 1: Gazing at Device [1: Yes]>
<Face 2: Gazing at Device [0: No]>
<Face 3: Gazing at Device [1: Yes]>
<Face 1: Speaking [1: Yes]>
<Face 2: Speaking [0: No]>
<Face 3: Speaking [0: No]>
<Face 1: User pointing at device [0.875]>

The scores may each be associated with time data (such as a timestamp, frame number, etc.) so the data from the user detector 425/system directed image detector 450 may be aligned with the data from the feature extractor 430/system directed audio detector 440.

The system directed image detector 450 may then determine, based on information from the user detector 425 as based on the image data whether an input relating to the image data is system directed. That determination may result in a score indicating whether the input is system directed based on the image data. If no audio data is available, the indication may be output as SDD result 442. If audio data is available, the indication may be sent to system directed detector 470 which may consider information from both system directed audio detector 440 and system directed image detector 450. The system directed detector 470 may then process the data from both system directed audio detector 440 and system directed image detector 450 to come up with an overall determination as to whether an input was system directed, which may be output as SDD result 442. The system directed detector 470 may consider not only data output from system directed audio detector 440 and system directed image detector 450 but also other data/metadata corresponding to the input. The system directed detector 470 may include one or more models which may analyze the various input data to make a determination regarding SDD result 442.

Figure 8:
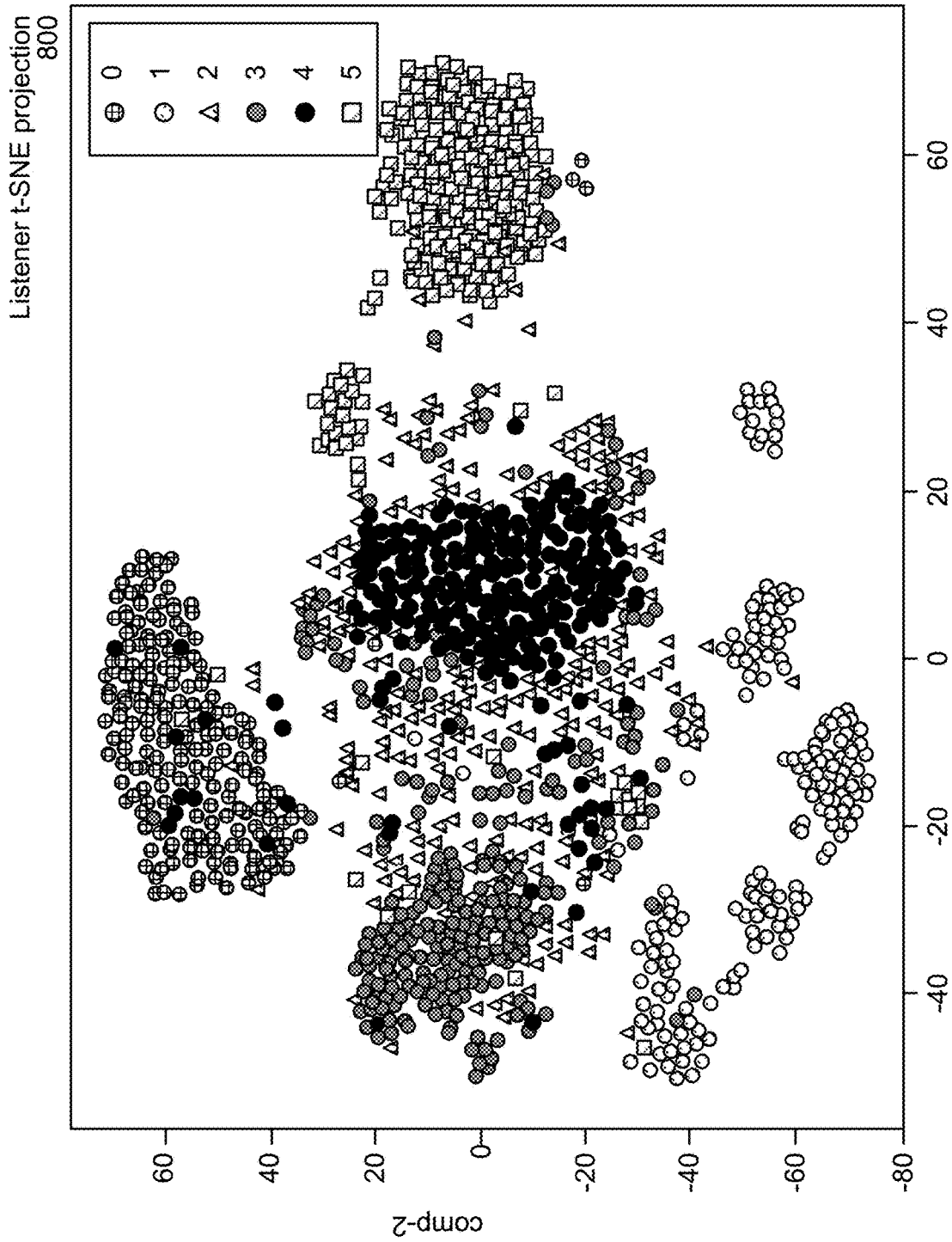
FIG. 8 illustrates examples of listener style representations according to embodiments of the present disclosure.

FIG. 8 illustrates examples of listener style representations according to embodiments of the present disclosure. As described above, the system 100 may process the training data associated with a listener, which may represent facial expressions, head pose parameters, and/or other characteristics of the listener, in order to extract a plurality of parameter values (e.g., expression parameters, head pose parameters, body position parameters, etc.) and generate high-dimensional vectors representing the listener's movements over time.

In some examples, the listening style of a listener may be visualized by generating two-dimensional embeddings from the training data. For example, the system 100 may generate the embeddings using a statistical method, such as t-distributed stochastic neighbor embedding (t-SNE), that enables the system 100 to visualize high-dimensional data by giving each datapoint a location in a two-dimensional (2D) map. Specifically, t-SNE processing models each high-dimensional object by a 2D datapoint in such a way that similar objects are modeled by nearby datapoints and dissimilar objects are modeled by distant datapoints with high probability. For example, similar facial expressions or listener responses may correspond to datapoints that are in proximity to each other in the 2D map, while distinct facial expressions may correspond to datapoints that are distant from each other in the 2D map.

FIG. 8 illustrates an example in which training data may represent six different listeners (e.g., six different individuals) over a period of time. Based on this training data, the system 100 may determine individual listener styles for each of the six listeners and may visualize these listener styles by generating t-SNE embeddings. For example, FIG. 8 illustrates an example of a listener t-SNE projection 800 that includes a plurality of t-SNE embeddings associated with the six listener IDs. As illustrated in the listener t-SNE projection 800, most of the listening styles can be distinguished fairly easily using first order moments (e.g., mean of facial expressions and head pose for each listener ID in the entire dataset), although there is significant overlap in two listening styles (e.g., listener 2 and listener 4). To accurately distinguish between listener representation styles, in some examples the system 100 may implement a machine learning model.

Figure 9:
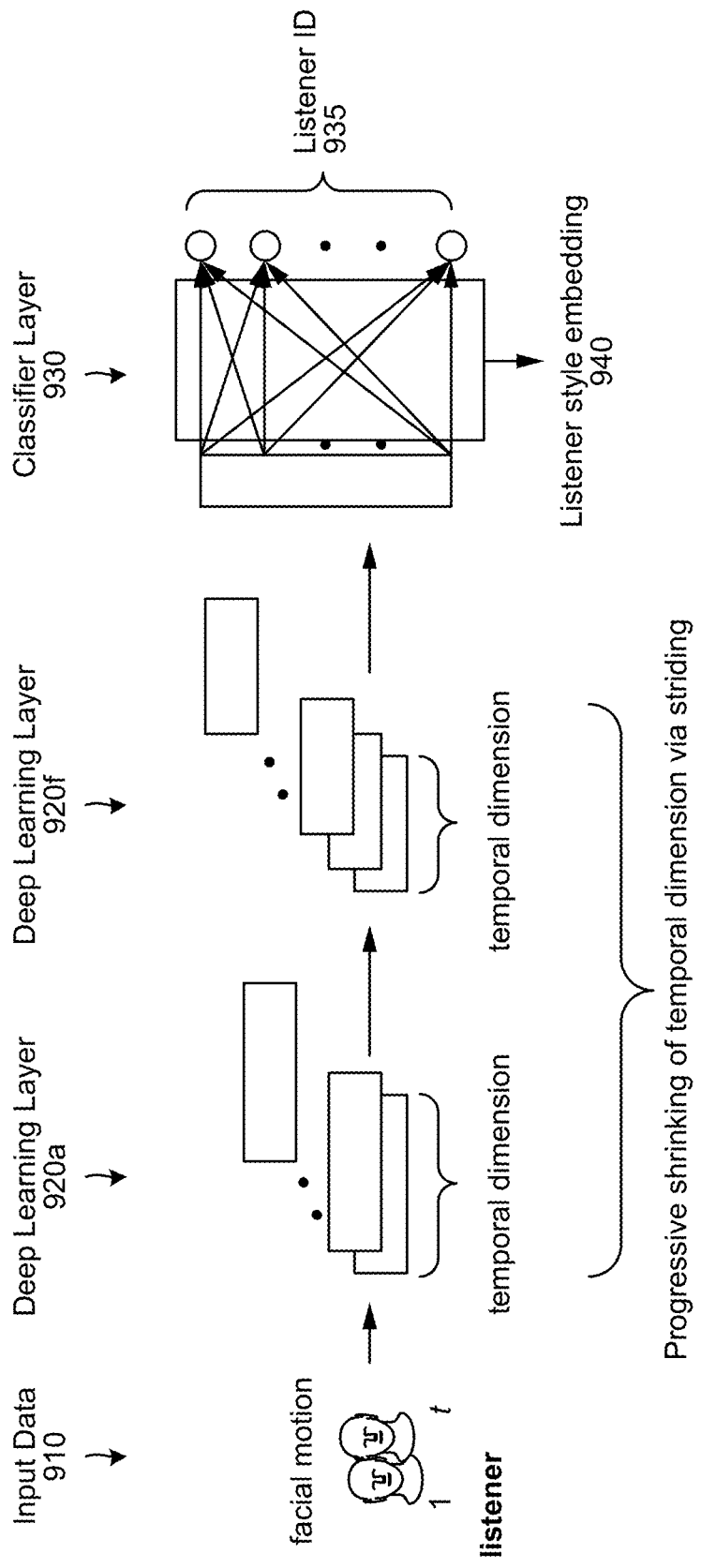
FIG. 9 illustrates an example of a listener style representation model according to embodiments of the present disclosure.

FIG. 9 illustrates an example of a listener style representation model according to embodiments of the present disclosure. As illustrated in FIG. 9, the system 100 may use a listener style representation model 900 to determine a listener style embedding 940 (e.g., listener representation style, style embedding, etc.) for an individual listener. For example, the system 100 may generate input data 910 corresponding to facial motion of a listener and may process the input data 910 using the listener style representation model 900 to generate the listener style embedding 940 associated with a unique listener identification (ID) 935.

The input data 910 may represent facial expressions, head pose parameters, and/or other characteristics of the listener. In some examples, the system 100 may extract a plurality of parameter values (e.g., facial expression parameters, head pose parameters, body position parameters, body language parameters, etc.) and generate the input data 910 as high-dimensional vectors representing the listener's movements over time. Thus, the system 100 may process these high-dimensional vectors to generate the listener style embedding 940, as described in greater detail below. However, the disclosure is not limited thereto, and the system 100 may generate the listener style embedding 940 using other techniques without departing from the disclosure.

The listener style embedding 940 is a representation of a particular listening style associated with the person represented in the input data 910 (e.g., the listener), and may correspond to facial expression parameters, head pose parameters, body position parameters, body language parameters, and/or the like without departing from the disclosure. In some examples, the input data 910 only includes facial motion associated with the listener, and the listener style embedding 940 may represent facial expressions, head pose parameters, and/or other information associated with movement of the listener's head and face. The disclosure is not limited thereto, however, and in other examples the input data 910 may also include body motion associated with the listener. For example, the listener style embedding 940 may represent facial expression parameters, head pose parameters, body position parameters, body language parameters, and/or other information associated with movement of the listener's head and face, upper body, entire body, and/or the like without departing from the disclosure.

While not illustrated in FIG. 9, in some examples the listener style embedding 940 may correspond to speech or other verbalizations associated with the listener without departing from the disclosure. For example, the input data 910 may include audio data representing vocal feedback generated by the listener while someone else is speaking (e.g., phrases, expressions, and/or other vocalizations responsive to the speaker). Thus, in some examples the listener style embedding 940 may include a representation of one or more frequently used utterances (e.g., words, expressions, or the like) that the listener uses while actively listening to the speaker.

In the example illustrated in FIG. 9, the input data 910 corresponds to motion data (e.g., facial motion) representing movement of the listener. In some examples, the system 100 may receive image data that includes one or more video clips (e.g., series of video frames or images) representing the listener and the system 100 may extract the motion data from the image data. For example, the system 100 may identify a plurality of landmarks (e.g., facial landmarks, body landmarks, and/or the like) corresponding to specific locations on the listener and may extract the motion data by tracking changes to the landmarks over time, although the disclosure is not limited thereto. However, the disclosure is not limited thereto, and in other examples the input data 910 may correspond to the image data without departing from the disclosure. For example, the listener style representation model 900 may process the image data itself instead of processing motion data extracted from the image data.

Referring to FIG. 9, the listener style representation model 900 may correspond to a one-dimensional (1D) temporal convolutional neural network (CNN) having a plurality of deep learning layers 920. In some examples, the listener style representation model 900 may include six deep learning layers 920a-920f, where each convolutional layer has a stride of 2 in the temporal dimension. For example, if the input data 910 includes 64 frames per input, the listener style representation model 900 may progressively reduce the temporal dimension to 1 in 6 layers. In addition, the listener style representation model 900 may increase from a first number of channels (e.g., 56 channels, which may correspond to 53 expression parameters and 3 head pose parameters, although the disclosure is not limited thereto) to a second number of channels (e.g., 256 channels) without departing from the disclosure. While FIG. 9 illustrates an example involving six deep learning layers 920*a*-920*f*, the disclosure is not limited thereto and the number of deep learning layers 920 may vary without departing from the disclosure.

The deep learning layers 920 are followed by a fully-connected (FC) classifier layer 930. In some examples, the classifier layer 930 may consist of six neurons, although the disclosure is not limited thereto. The listener style representation model 900 may employ supervised cross-entropy loss from the ground truth listener identity available in the dataset to optimize the weights of the network. To obtain a listener style embedding 940, the system 100 may extract the weights of the classifier layer 930. For example, the subset of the weights connecting each listener style in the output layer may be determined to represent the listener style embedding corresponding to that style. Using the listener style representation model 900, the system 100 may generate diverse listening styles by sampling from the embedding space. For example, the system 100 may assume the listening styles to be Gaussian and independently and identically distributed, where the mean and standard deviation of the expression/pose parameters are computed empirically from the style embedding space.

As described in greater detail above, the system 100 may identify facial expressions and other nonverbal behavior by tracking facial landmarks over time. In some examples, the system 100 may receive image data that includes one or more video clips (e.g., series of video frames or images) representing the listener and the system 100 may extract motion data from the image data. For example, the system 100 may identify a plurality of landmarks (e.g., facial landmarks, body landmarks, and/or the like) corresponding to specific locations on the listener and may extract the motion data by tracking changes to the landmarks over time, although the disclosure is not limited thereto. Examples of facial landmarks are illustrated in FIG. 10, which depicts rendering examples 1000 corresponding to two different listeners.

As illustrated in FIG. 10, the system 100 may process first image data to identify first facial landmarks 1010 associated with a first user. The first facial landmarks correspond to second facial landmarks 1020 associated with a first mesh model representing the first user, enabling the system 100 to mirror facial expressions, facial motion, and/or other nonverbal gestures generated by the first user. Similarly, the system 100 may process second image data to identify third facial landmarks 1030 associated with a second user. The third facial landmarks correspond to fourth facial landmarks 1040 associated with a second mesh model representing the second user, enabling the system 100 to mirror facial expressions, facial motion, and/or other nonverbal gestures generated by the second user.

To illustrate an example, the system 100 may receive image data including a plurality of video frames. To process the image data, the system 100 may select an individual video frame, detect a bounding box corresponding to a portion of the video frame representing the listener's face, and extract the face. The system 1000 may input the extracted face to a model configured to output 3D Morphable Model (3DMM) parameters for a dense 3D mesh representation of the face, although the disclosure is not limited thereto. As used herein, the 3D mesh representation may be referred to as a mesh model and/or the like without departing from the disclosure. In some examples, the model may be a deep neural network (DNN) model that is trained to take the output of a face detector (e.g., a portion of image data cropped around a face) as input and directly output the 3DMM parameters, although the disclosure is not limited thereto.

The 3DMM parameters may include shape parameters (e.g., parameters representing a face shape), expression parameters (e.g., parameters representing facial expression (s)), a scalar parameter, a rotation vector, a translation vector, and/or additional parameters corresponding to the face. For example, the shape parameters enable the system 100 to model the user's specific facial shape, the expression parameters enable the system 100 to model the user's facial expression(s), and the scalar parameter, the rotation vector, and the translation vector modify the size, rotation, and position of the mesh model, respectively.

Figure 11:
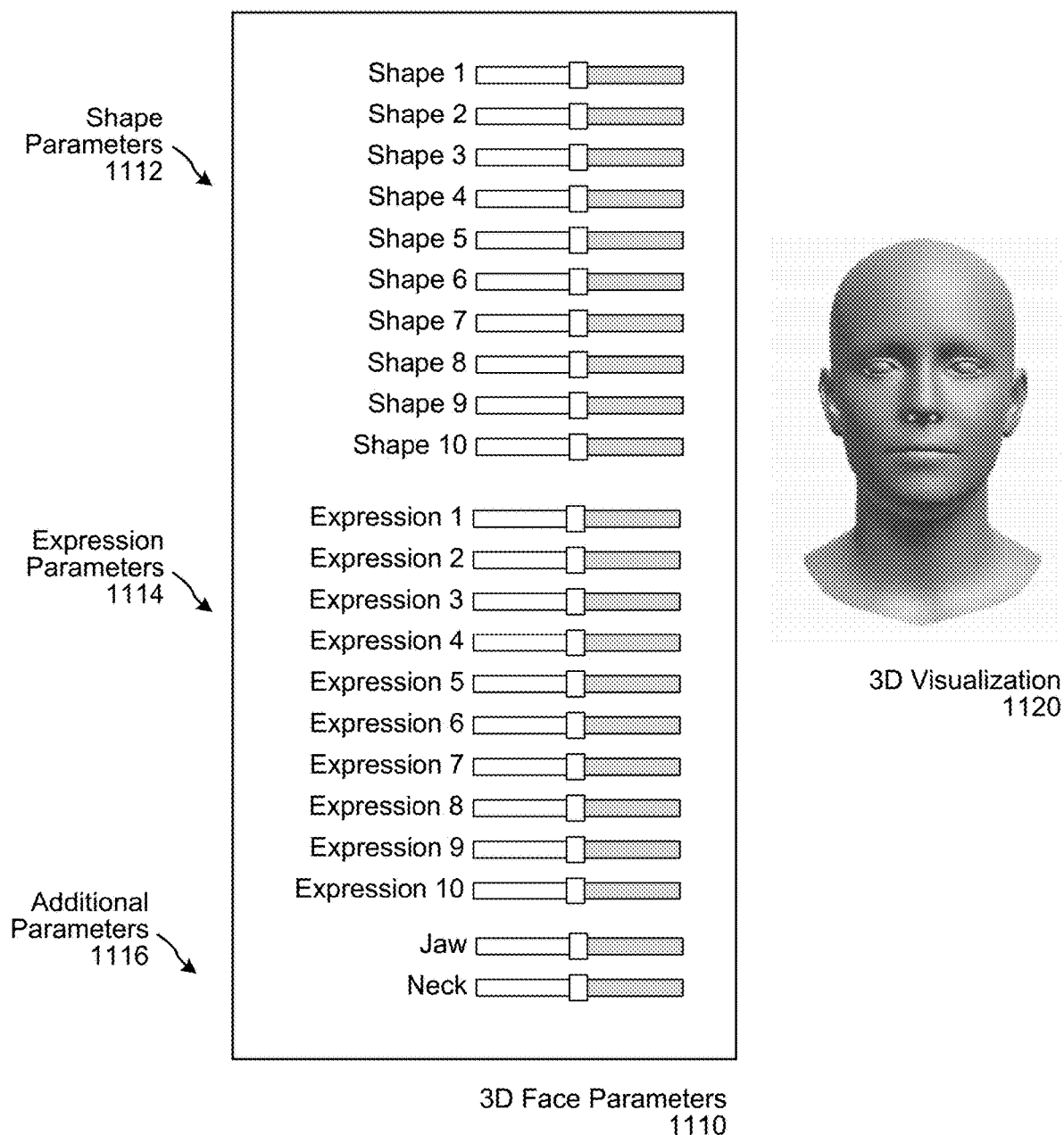
FIG. 11 is a conceptual diagram illustrating an example of shape parameters and expression parameters according to embodiments of the present disclosure.

FIG. 11 is a conceptual diagram illustrating an example of shape parameters and expression parameters according to embodiments of the present disclosure. As illustrated in FIG. 11, the system 100 may use 3D face parameters 1110 to generate a 3D visualization 1120 of the user's face. In the example illustrated in FIG. 11, the 3D face parameters 1110 include shape parameters 1112, expression parameters 1114, and additional parameters 1116, although the disclosure is not limited thereto. While FIG. 11 illustrates an example in which the 3D face parameters 1110 include a certain number of shape parameters 1221 and/or expression parameters 1114, the disclosure is not limited thereto and the number of parameters may vary without departing from the disclosure.

While FIG. 11 only illustrates examples of 3D face parameters 1110, the disclosure is not limited thereto and the system 100 may use 3D body parameters (not illustrated) without departing from the disclosure. For example, the 3D body parameters may include shape parameters corresponding to unique characteristics of the user's body shape, expression parameters representing body language, body positions, and/or the like representing the user's nonverbal behavior, and/or additional parameters that the system 100 may use to transform the 3D visualization to mirror the user's body motion, although the disclosure is not limited thereto.

Figure 12:
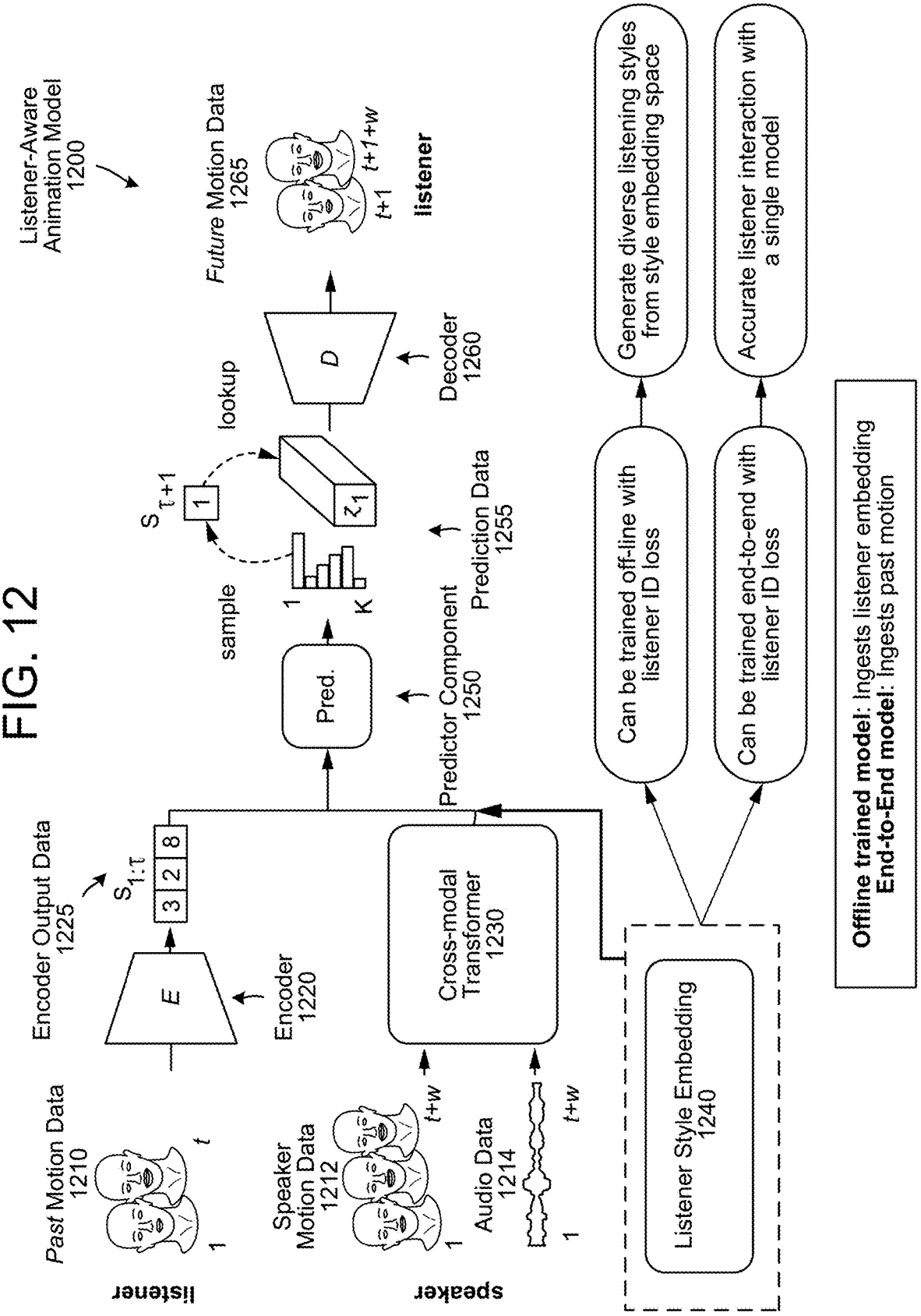
FIG. 12 illustrates an example of a listener-aware animation model according to embodiments of the present disclosure.

FIG. 12 illustrates an example of a listener-aware animation model according to embodiments of the present disclosure. As illustrated in FIG. 12, a listener-aware animation model 1200 may process multimodal inputs associated with a speaker (e.g., first user) to generate animation data responsive to the speaker. The animation data may correspond to facial animations that mimic listening behavior of a virtual user (e.g., avatar), enabling the system 100 to generate a rendering of the virtual user listening to the speaker during a conversation.

To illustrate an example, the system 100 may enable functionality associated with a virtual assistant, such as processing voice commands and other inputs from the speaker. To improve a user interface and/or interaction with the speaker, the system 100 may render the virtual assistant as a virtual user. For example, while the system 100 receives and/or processes a voice command from the speaker, the system 100 may generate a rendering of the virtual user listening to the speaker. However, the disclosure is not limited thereto and the system 100 may generate a variety of different animations without departing from the disclosure.

The listener-aware animation model 1200 generates animation data that is (i) responsive to the multimodal inputs and (ii) associated with a specific listening style. For example, the listener-aware animation model 1200 may generate animation data representing different listener responses depending on the content of the multimodal inputs, such that the listener response is responsive to the voice command being received. In addition, the listener-aware animation model 1200 may generate animation data representing different listening styles depending on a listener identifier, listener identification (ID), listener style embedding, and/or the like. For example, in response to a single multimodal input, the listener-aware animation model 1200 may generate animation data for multiple virtual users, with similar listener responses represented using unique facial expressions, head motions, and/or the like based on the listener identifier. Thus, the speaker may perceive different listening styles and distinguish between the multiple virtual users despite the similarity of their responses.

In some examples, the animation data may correspond to facial animations that represent facial motion of the virtual user. For example, the animation data may represent facial expressions, head motion (e.g., head pose parameters), and/or other characteristics associated with the listener's face. However, the disclosure is not limited thereto, and in other examples the animation data may correspond to facial motion and limited body motion without departing from the disclosure. For example, the animation data may represent facial expressions, head motion, arm movements, hand gestures, body language, and/or other characteristics associated with the listener's face and upper body. Additionally or alternatively, the animation data may correspond to both facial motion and body motion without departing from the disclosure. For example, the animation data may represent facial expressions, head motion, arm movements, hand gestures, body language, posture, leg movements, and/or other characteristics associated with the listener's entire body.

As described above with regard to FIG. 9, in some examples the system 100 may process input data 910 using the listener style representation model 900 to determine a listener style embedding 940 and associate the listener style embedding 940 with a specific listener ID 935. For example, the system 100 may process first training data compiled for an individual to determine a first listener style embedding 940a that represents a listening style of a first listener, such as unique facial expressions, head motion, mannerisms, gestures, and/or the like. The system 100 may store this first listener style embedding 940a in association with a first listener ID 935a, enabling the system 100 to generate animation data modeling the first listener using the first listener ID 935a. Thus, the first listener ID 935a corresponds to both the first listener style embedding 940a and the first listener represented in the first training data.

In addition, the system 100 may process second training data compiled for a second listener to determine a second listener style embedding 940b that represents a listening style of the second listener. The system 100 may store this second listener style embedding 940b in association with a second listener ID 935b, enabling the system 100 to generate animation data modeling the second listener using the second listener ID 935b. The second listener style embedding 940b may be distinguished from the first listener style embedding 940a, enabling the system 100 to generate first animation data representing the first listener or second animation data representing the second listener based on the listener ID 935.

After generating listener style embeddings 940 for several listeners, the system 100 may generate new listening styles without requiring training data. In some examples, the system 100 may use the multiple listener style embeddings 940 to determine an embedded space and may sample from the embedded space to generate a new listening style associated with unique facial expressions and/or head motions. For example, the system 100 may use the embedded space to determine a third listener style embedding that represents a listening style of a virtual listener (e.g., synthetic listener) that was not represented in the training data. Thus, the system 100 may deploy a single model that can be generalized to new listeners to generate new listener facial responses. However, as the listener ID 935 allows the system 100 to identify an individual listening style, the model enables the system 100 to choose a specific listening style and/or modify behavior of a virtual listener for a specific application.

In the example illustrated in FIG. 12, a listener style embedding 1240 may correspond to an actual listener and/or a virtual listener without departing from the disclosure. For example, a first listener style embedding 1240a may be generated by processing training data using the listener style representation model 900 described above, while a second listener style embedding 1240b may be generated by sampling the embedded space, such that the second listener style embedding 1240b does not correspond to training data.

The system 100 may incorporate (e.g., fuse) the listener style embeddings 1240 with the listener-aware animation model 1200 using two different techniques. In a first implementation, the system 100 may extract the listener style embeddings 1240 offline and fuse the listener style embeddings 1240 corresponding to the desired listening style during normal operation (e.g., run-time). For example, the system 100 may use the listener style representation model 900 to determine a listener style embedding 1240 and may then input the listener style embedding 1240 to the listener-aware animation model 1200.

In a second implementation, the system 100 may train the 1-D listener embedding model (e.g., listener style representation model 900) end-to-end with the listener-aware animation model 1200. For example, the system 100 may train the listener style representation model 900 end-to-end with the listener-aware animation model 1200 with similar cross-entropy loss, where the listener style embeddings 1240 that are connected to the output layer of the listener style representation model 900 are fused directly output from the encoder component 1220 and/or the cross-modal transformer component 1230. While the first implementation can generate new listening styles during normal operation (e.g., run-time), the second implementation can better capture the different listening styles using a single model.

To accurately capture the listening dynamics from the fused outputs, the listener-aware animation model 1200 may include a transformer-based predictor component 1250 that learns to model temporally long-range patterns in the input sequence. For example, the predictor component 1250 may receive three inputs; a first input associated with the listener, a second input associated with the speaker, and a third input corresponding to the listener style embedding 1240.

As illustrated in FIG. 12, the first input associated with the listener corresponds to past motion data 1210 of the listener processed by an encoder component 1220. For example, the encoder component 1220 may receive the past motion data 1210 representing facial motion of the listener and may generate encoder output data 1225. In contrast, the second input associated with the speaker corresponds to current motion of the speaker (e.g., speaker motion data 1212) and audio data 1214 of the speaker processed by the cross-modal transformer component 1230. For example, to model the speaker's audio and facial motion, the system 100 may train the cross-modal transformer component 1230 to fuse the two modalities and generate speaker cross-modal output. Finally, the third input corresponding to the listener style embedding 1240 may be generated using the listener style representation model 900, as described above.

To represent the manifold of realistic listener facial motion, the encoder component 1220 may be implemented as a vector quantized variational auto-encoder (VQ-VAE). For example, the system 100 may extend the VQ-VAE to the domain of motion synthesis and learn a codebook of a discrete latent space (e.g., codebook data). This discrete representation enables the system 100 to predict a multinomial distribution over a next timestep of motion data. For example, the predictor component 1250 may be implemented as an autoregressive predictor configured to output a distribution over possible synchronous and realistic listener responses, from which the system 100 may sample multiple trajectories.

To illustrate an example, let $F=\{f_i\}_{i=1}^T$ be a temporal sequence of facial motions $f_i$. Thus, $F^S$ may denote the motion of the speaker, while $F^L$ may denote the motion of the listener. For each timestep $t \in [1,T]$, the system 100 may process a speaker's facial motion $F_{1:t}^S = (f_1^S, \ldots, f_t^S)$ and a corresponding speaker audio sequence $A_{1:t}^S$, along with any previously predicted past listener motion $F_{1:t-1}^L$, if available, as input. The predictor component 1250 may autoregressively predict the corresponding listener facial motion one time-step at a time:

$$\hat{f}_t^L = \mathcal{P}(F_{1:t}^S, A_{1:t}^S, F_{1:t-1}^L) \quad [1]$$

where $\mathcal{P}$ learns to model the distribution over the next timestep of listener motion:

$$\mathcal{P}(\hat{f}_t^L | F_{1:t}^S, A_{1:t}^S, F_{1:t-1}^L) \quad [2]$$

As illustrated in FIG. 12, the predictor component 1250 may predict a distribution over future listener motion conditioned on the multimodal inputs from the speaker. For example, the predictor component 1250 may output a distribution over K discrete codebook indices, from which the system 100 may sample a code for the next timestep. The system 100 may then obtain the continuous future listener motion by decoding the sampled codebook index. For ease of illustration, the output of the predictor component 1250 is labeled prediction data 1255, which encompasses the combination of the distribution, sampled code, and continuous future listener motion. Thus, a decoder component 1260 may decode the prediction data 1255 to generate future motion data 1265 associated with the listener. For example, the system 100 may use the future motion data 1265 to animate the virtual listener, although the disclosure is not limited thereto.

As illustrated in FIG. 12, the first implementation can be trained off-line (e.g., not during normal operation) with listener ID loss and may be configured to generate diverse listening styles from the style embedding space. Thus, the first implementation may correspond to an offline trained model that is configured to ingest a listener embedding (e.g., listener style embedding 1240). Thus, the system 100 may determine the listener style embedding 1240 using the listener style representation model 900, which may be trained separately from the listener-aware animation model 1200.

In contrast, the second implementation can be trained end-to-end with listener ID loss and may be configured to generate an accurate listener interaction using only a single model. Thus, the second implementation may correspond to an end-to-end model that is configured to ingest past motion of the listener (e.g., past motion data 1210).

While FIG. 12 illustrates two potential implementations of adding the listener style embedding 1240 to the listener-aware animation model 1200, the disclosure is not limited thereto. For example, both implementations illustrated in FIG. 12 rely on using the listener style representation model 900 to process motion data and determine the listener style embedding 1240. Instead of determining the listener style embedding 1240 by ingesting motion data using a separate model (e.g., the listener style representation model 900), the system 100 may implement a listener-aware animation model using a listener ID. Using the listener ID enables the system 100 to model multiple listeners using a single model without requiring training data for each listener.

While FIG. 12 illustrates an example that includes the cross-modal transformer component 1230, this is intended to conceptually illustrate a simple example and the disclosure is not limited thereto. Thus, the listener-aware animation model 1200 may include a variety of components in place of the cross-modal transformer component 1230 without departing from the disclosure. Additionally or alternatively, while FIG. 12 illustrates the cross-modal transformer component 1230 processing the speaker motion data 1212 and the audio data 1214, the disclosure is not limited thereto. For example, the system 100 may process the speaker motion data 1212 without processing the audio data 1214 or may process the audio data 1214 without processing the speaker motion data 1212 without departing from the disclosure.

In some examples, the system 100 may process one or more of the speaker motion data 1212, image data representing the speaker motion (e.g., video of the speaker), the audio data 1214, text data representing the speech as a textual input, additional input signals, and/or a combination thereof without departing from the disclosure. For example, the system 100 may process the speaker motion data 1212, the speaker motion data 1212 and the audio data 1214, the speaker motion data 1212 and the text data, the speaker motion data 1212 and both the audio data 1214 and the text data, and so on without departing from the disclosure. Additionally or alternatively, the system 100 may process the audio data 1214, the audio data 1214 and the image data, the audio data 1214 and both the speaker motion data 1212 and the image data, and so on without departing from the disclosure. In some examples, the system 100 may represent the speaker input signal using vector data that includes each of the potential modalities, such that a first portion of the speaker input signal corresponds to the speaker motion data 1212, a second portion corresponds to the image data, a third portion corresponds to the audio data, a fourth portion corresponds to the text data, a fifth portion correspond to an additional input signal, and/or the like. Thus, if the speaker input signal only includes the audio data 1214, the audio data 1214 would be represented in the second portion and the rest of the vector data would correspond to a noise signal without departing from the disclosure.

While FIG. 12 illustrates the encoder 1220 receiving the past motion data 1210, the disclosure is not limited thereto. In some examples, the listener may correspond to a human, such as a remote user in a communication session or virtual conversation. In this example, the remote user may generate remote speech and the system 100 may animate the listener using the remote speech. For example, the encoder 1220 may receive the past motion data 1210 along with audio data representing the remote speech without departing from the disclosure. Additionally or alternatively, the system 100 may receive additional input signals associated with the remote user, such as text data representing the speech, image data representing the remote user, and/or the like, although the disclosure is not limited thereto.

Figure 13A:
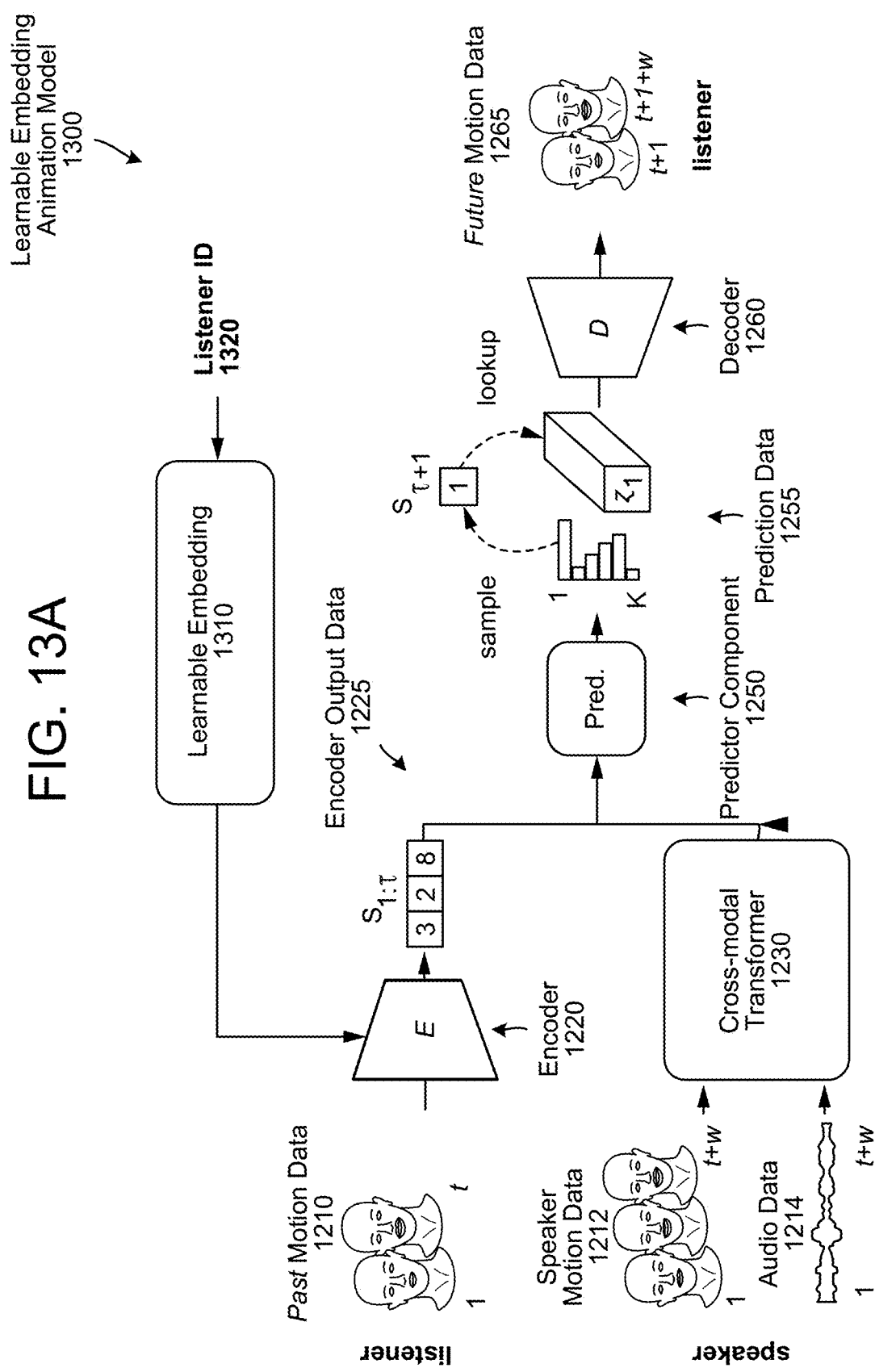
FIGS. 13A-13B illustrate examples of a learnable embedding animation model according to embodiments of the present disclosure.
Figure 13B:
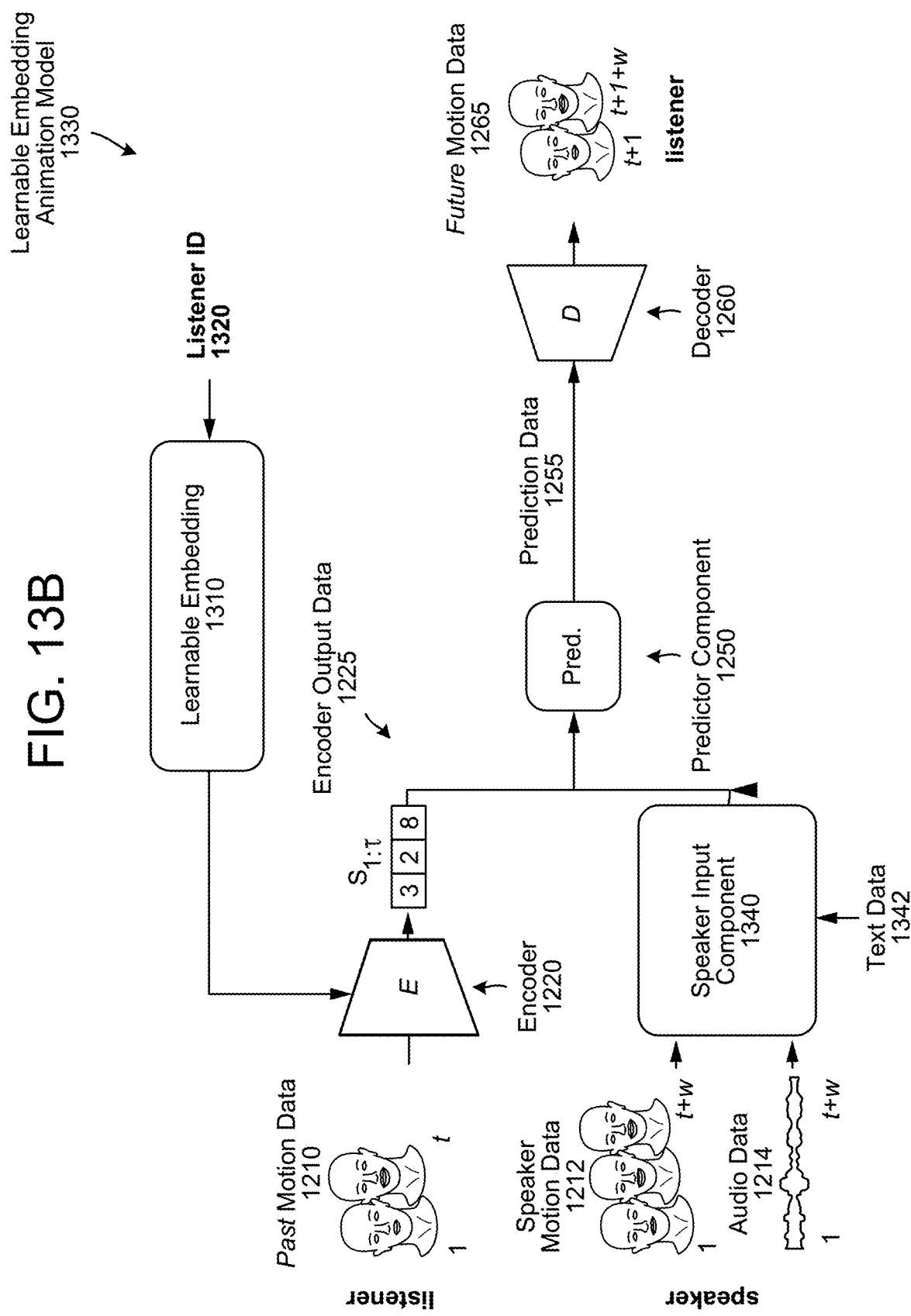

FIGS. 13A-13B illustrate examples of a learnable embedding animation model according to embodiments of the present disclosure. As illustrated in FIG. 13A, in some examples the system 100 may implement a learnable embedding animation model 1300 by adding a learnable embedding component 1310. For example, the learnable embedding component 1310 may ingest the listener identifier (ID) 1320 and map it to a style embedding via a learnable codebook (e.g., codebook data). To illustrate an example, the learnable embedding animation model 1300 may add an embedding head that varies depending on the listener identity, which is injected into the encoder component 1220 (e.g., generative VQ-VAE). Thus, the encoder component 1220 incorporates the listener style embedding, although the disclosure is not limited thereto.

While FIG. 13A illustrates an example that includes the cross-modal transformer component 1230, this is intended to conceptually illustrate a simple example and the disclosure is not limited thereto. Thus, the system 100 may include a variety of components in place of the cross-modal transformer component 1230 without departing from the disclosure. Additionally or alternatively, while FIG. 13A illustrates the cross-modal transformer component 1230 processing the speaker motion data 1212 and the audio data 1214, the disclosure is not limited thereto. For example, the system 100 may process the speaker motion data 1212 without processing the audio data 1214 or may process the audio data 1214 without processing the speaker motion data 1212 without departing from the disclosure.

As illustrated in FIG. 13B, in some examples a learnable embedding animation model 1330 may include a speaker input component 1340 configured to process one or more of the speaker motion data 1212, image data representing the speaker motion (e.g., video of the speaker), the audio data 1214 representing speech, text data 1342 representing the speech as a textual input, NLU data, additional input signals, and/or a combination thereof without departing from the disclosure. For example, the system 100 may process the speaker motion data 1212, the speaker motion data 1212 and the audio data 1214, the speaker motion data 1212 and the text data 1342, the speaker motion data 1212 and both the audio data 1214 and the text data 1342, and so on without departing from the disclosure. Additionally or alternatively, the system 100 may process the audio data 1214, the audio data 1214 and the speaker motion data 1212, the audio data 1214 and the image data, the audio data 1214 and both the speaker motion data 1212 and the image data, and so on without departing from the disclosure.

In some examples, the system 100 may represent the speaker input signal using vector data that includes each of the potential modalities, such that a first portion of the speaker input signal corresponds to the speaker motion data 1212, a second portion corresponds to the image data, a third portion corresponds to the audio data, a fourth portion corresponds to the text data 1342, a fifth portion corresponds to the NLU data, a sixth portion corresponds to an additional input signal, and/or the like. Thus, if the speaker input signal only includes the audio data 1214, the audio data 1214 would be represented in the second portion and the rest of the vector data would correspond to a noise signal without departing from the disclosure.

In some examples, the speaker input component 1340 may receive NLU data and the speaker input signal may represent the NLU data, such that the listener animation is generated based on the NLU data. For example, the system 100 may generate the listener animation in response to the NLU data as well as the audio data 1214 and/or the text data 1342, enabling the animation to react based on a meaning derived from the speech. Additionally or alternatively, the NLU data or other input may indicate whether the speaker is speaking to the device 110 and the system 100 may be configured to only generate listener animations when the system 100 detects system-directed speech. For example, the system directed input detector 285/385 may determine whether the speech is directed to the system 100 (e.g., system-directed speech) or directed to another user (e.g., non-system-directed speech, such as conversation with another person in the room) and may only generate the listener animations in response to the system-directed speech.

While FIGS. 13A-13B illustrate the encoder 1220 receiving the past motion data 1210, the disclosure is not limited thereto. In some examples, the listener may correspond to a human, such as a remote user in a communication session or virtual conversation. In this example, the remote user may generate remote speech and the system 100 may animate the listener using the remote speech. For example, the encoder 1220 may receive the past motion data 1210 along with audio data representing the remote speech without departing from the disclosure. Additionally or alternatively, the system 100 may receive additional input signals associated with the remote user, such as text data representing the speech, image data representing the remote user, and/or the like, although the disclosure is not limited thereto.

While FIG. 13A illustrated the learnable embedding animation model 1300 as performing sample and lookup operations between the predictor component 1250 and the decoder component 1260, the disclosure is not limited thereto. Instead, FIG. 13B illustrates that the learnable embedding animation model 1330 may skip these steps and the decoder component 1260 may generate the future motion data 1265 based on the prediction data 1255 output by the predictor component 1250 without departing from the disclosure.

Figure 14A:
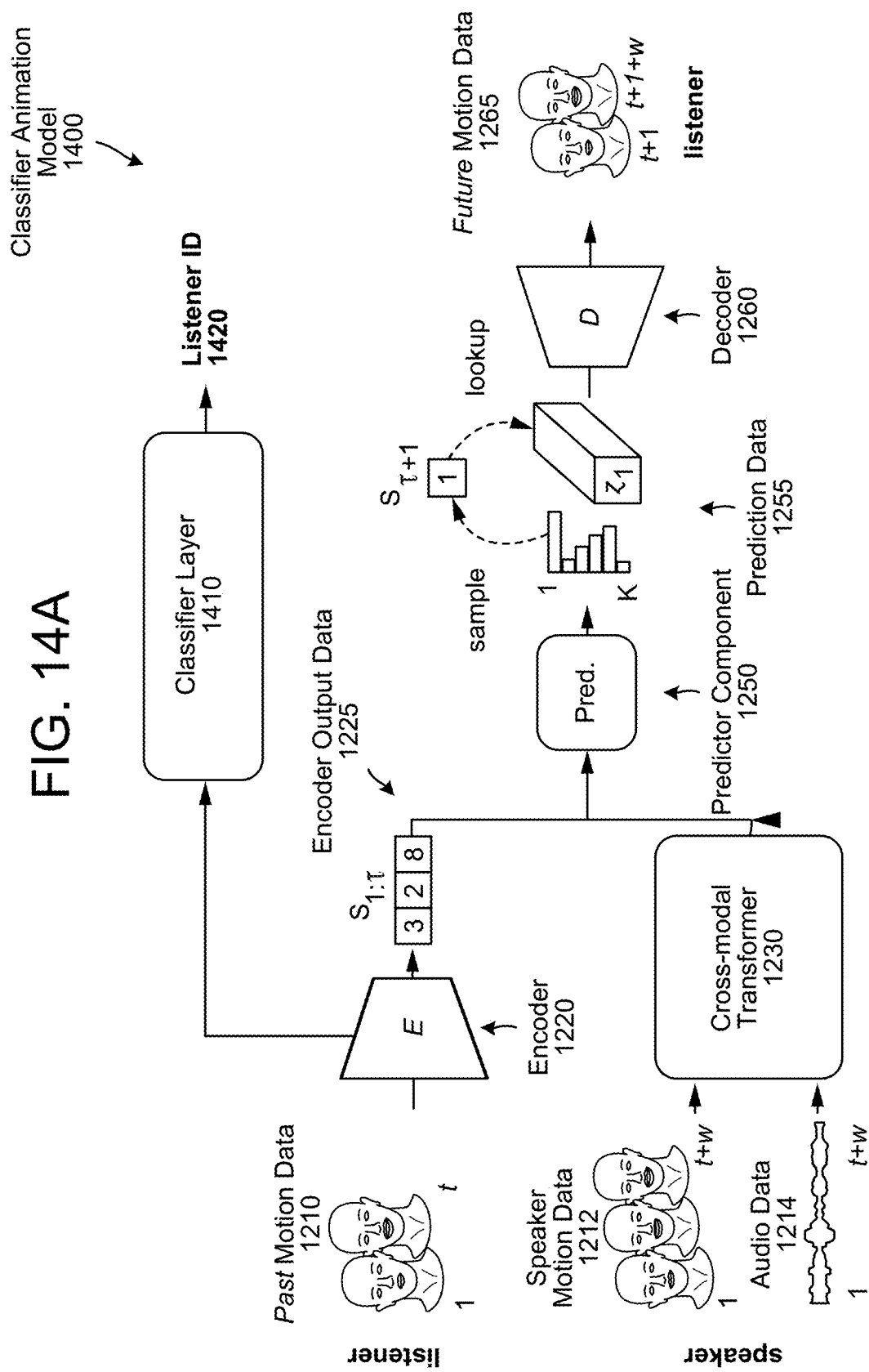
FIGS. 14A-14B illustrate examples of a classifier animation model according to embodiments of the present disclosure.
Figure 14B:
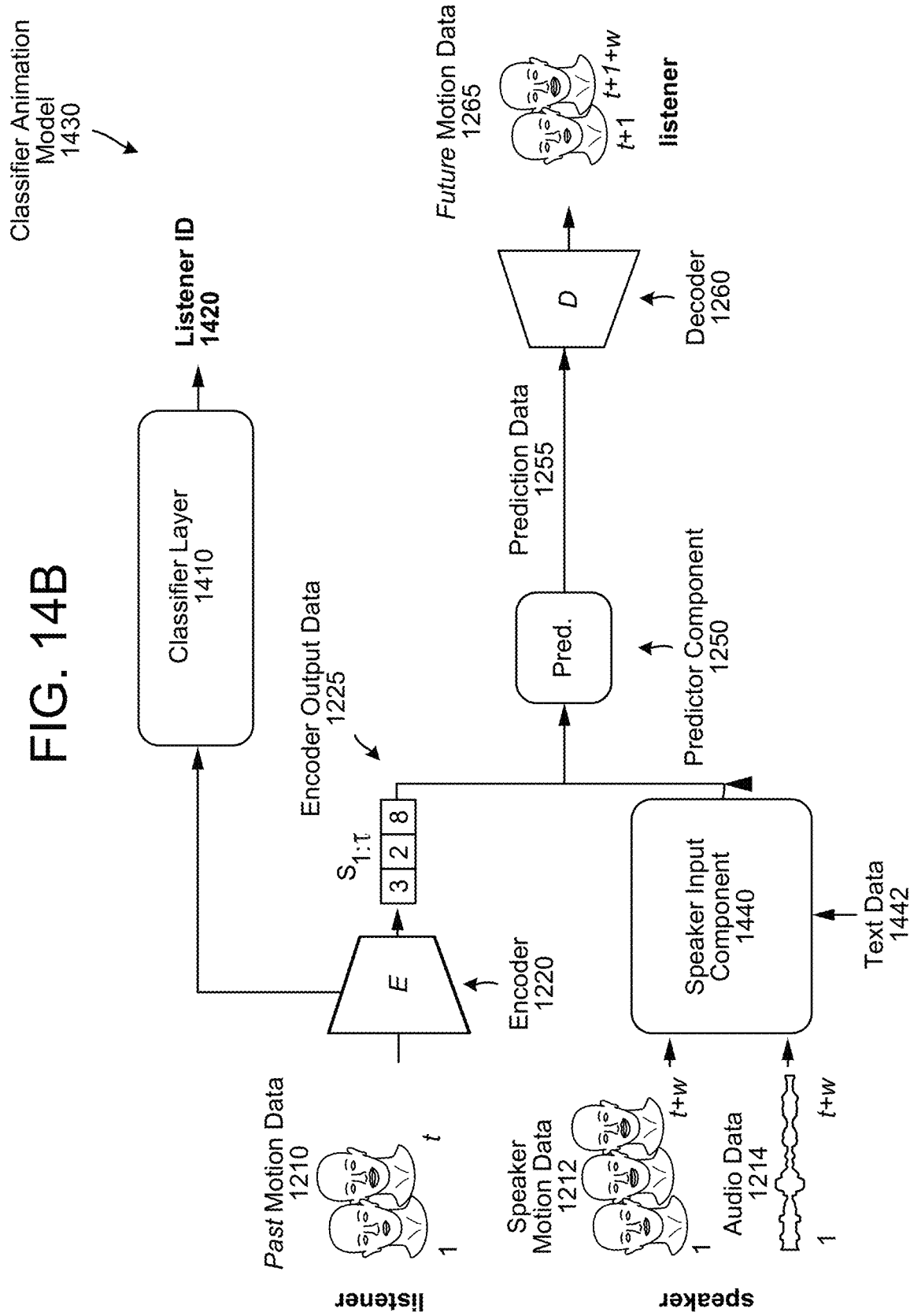

FIGS. 14A-14B illustrate examples of a classifier animation model according to embodiments of the present disclosure. As illustrated in FIG. 14A, in some examples the system 100 may implement a classifier animation model 1400 by adding a classifier layer component 1410. For example, the classifier layer component 1410 may be positioned at the output of the encoder component 1220, and may be trained with the encoder component 1220 using the cross-entropy loss from the ground truth listener identity data (e.g., listener ID 1420). Thus, the encoder component 1220 incorporates the listener style embedding, although the disclosure is not limited thereto.

While FIG. 14A illustrates an example that includes the cross-modal transformer component 1230, this is intended to conceptually illustrate a simple example and the disclosure is not limited thereto. Thus, the system 100 may include a variety of components in place of the cross-modal transformer component 1230 without departing from the disclosure. Additionally or alternatively, while FIG. 14A illustrates the cross-modal transformer component 1230 processing the speaker motion data 1212 and the audio data 1214, the disclosure is not limited thereto. For example, the system 100 may process the speaker motion data 1212 without processing the audio data 1214 or may process the audio data 1214 without processing the speaker motion data 1212 without departing from the disclosure.

As illustrated in FIG. 14B, in some examples a classifier animation model 1430 may include a speaker input component 1440 configured to process one or more of the speaker motion data 1212, image data representing the speaker motion (e.g., video of the speaker), the audio data 1214 representing speech, text data 1442 representing the speech as a textual input, NLU data, additional input signals, and/or a combination thereof without departing from the disclosure. For example, the system 100 may process the speaker motion data 1212, the speaker motion data 1212 and the audio data 1214, the speaker motion data 1212 and the text data 1442, the speaker motion data 1212 and both the audio data 1214 and the text data 1442, and so on without departing from the disclosure. Additionally or alternatively, the system 100 may process the audio data 1214, the audio data 1214 and the speaker motion data 1212, the audio data 1214 and the image data, the audio data 1214 and both the speaker motion data 1212 and the image data, and so on without departing from the disclosure.

In some examples, the system 100 may represent the speaker input signal using vector data that includes each of the potential modalities, such that a first portion of the speaker input signal corresponds to the speaker motion data 1212, a second portion corresponds to the image data, a third portion corresponds to the audio data 1214, a fourth portion corresponds to the text data 1442, a fifth portion corresponds to the NLU data, a sixth portion corresponds to an additional input signal, and/or the like. Thus, if the speaker input signal only includes the audio data 1214, the audio data 1214 would be represented in the second portion and the rest of the vector data would correspond to a noise signal without departing from the disclosure.

In some examples, the speaker input component 1440 may receive NLU data and the speaker input signal may represent the NLU data, such that the listener animation is generated based on the NLU data. For example, the system 100 may generate the listener animation in response to the NLU data as well as the audio data 1214 and/or the text data 1442, enabling the animation to react based on a meaning derived from the speech. Additionally or alternatively, the NLU data or other input may indicate whether the speaker is speaking to the device 110 and the system 100 may be configured to only generate listener animations when the system 100 detects system-directed speech. For example, the system directed input detector 285/385 may determine whether the speech is directed to the system 100 (e.g., system-directed speech) or directed to another user (e.g., non-system-directed speech, such as conversation with another person in the room) and may only generate the listener animations in response to the system-directed speech.

While FIGS. 14A-14B illustrate the encoder 1220 receiving the past motion data 1210, the disclosure is not limited thereto. In some examples, the listener may correspond to a human, such as a remote user in a communication session or virtual conversation. In this example, the remote user may generate remote speech and the system 100 may animate the listener using the remote speech. For example, the encoder 1220 may receive the past motion data 1210 along with audio data representing the remote speech without departing from the disclosure. Additionally or alternatively, the system 100 may receive additional input signals associated with the remote user, such as text data representing the speech, image data representing the remote user, and/or the like, although the disclosure is not limited thereto.

While FIG. 14A illustrated the classifier animation model 1400 as performing sample and lookup operations between the predictor component 1250 and the decoder component 1260, the disclosure is not limited thereto. Instead, FIG. 14B illustrates that the classifier animation model 1430 may skip these steps and the decoder component 1260 may generate the future motion data 1265 based on the prediction data 1255 output by the predictor component 1250 without departing from the disclosure.

The listener animations described above with regard to FIGS. 12-14B may be generated by the animation control component 275, although the disclosure is not limited thereto.

FIG. 15 illustrates an example of an animation pipeline according to embodiments of the present disclosure. In some examples, an animation pipeline 1500 may include an orchestrator component 1510, a transformer component 1520, a rendering component 1530, and an encoding component 1540, although the disclosure is not limited thereto and the animation pipeline 1500 may include additional components without departing from the disclosure.

As illustrated in FIG. 15, the transformer component 1520 may include machine learning (ML) models 1525 and may be configured to generate the animation data described above. For example, the transformer component 1520 may receive multimodal inputs corresponding to the speaker and may process the multimodal inputs to generate the animation data representing a listener response with which to animate a virtual listener. The transformer component 1520 may send the animation data to the orchestrator component 1510. In some examples, the animation data may correspond to mesh models and/or other representations of the virtual listener.

The orchestrator component 1510 may send the animation data to the rendering component 1530. As illustrated in FIG. 15, the rendering component 1530 may include a rendering engine 1535 and may be configured to process the animation data to generate rendered image data (e.g., rendering) representing the virtual listener. For example, the rendering engine 1535 may generate image data representing the virtual listener performing the facial animations indicated by the animation data, although the disclosure is not limited thereto. Thus, the image data may represent a series of images stitched together to illustrate the facial animations associated with the virtual listener. The rendering component 1530 may send the rendered image data to the orchestrator component 1510.

In some examples, the orchestrator component 1510 may send the rendered image data to the encoding component 1540 and the encoding component 1540 may be configured to encode the rendered image data, although the disclosure is not limited thereto. For example, if the transformer component 1520 and the rendering component 1530 are associated with the supporting device(s) 120 that are remote from the device 110, the supporting device(s) 120 may include the encoding component 1540. Thus, the encoding component 1540 may encode the rendered image data to generate encoded image data and the supporting device(s) 120 may send the encoded image data to the device 110. However, the disclosure is not limited thereto, and in other examples the transformer component 1520 and the rendering component 1530 may be associated with the device 110 itself. In this example, the device 110 may not include the encoding component 1540 and may instead send the rendered image data directly to a display of the device 110 without departing from the disclosure. Thus, the components illustrated in FIG. 15 may be included on the device 110, the supporting device(s) 120, other devices (not illustrated), and/or a combination thereof without departing from the disclosure.

FIG. 16 illustrates examples of facial expressions according to embodiments of the present disclosure. As illustrated by expression examples 1600, the system 100 may generate a variety of facial expressions without departing from the disclosure. In a first expression example 1610, the system 100 may animate a first facial expression corresponding to listening thoughtfully in response to the speaker. In a second expression example 1620, the system 100 may animate a second facial expression corresponding to smiling. In a third expression example 1630, the system 100 may animate a third facial expression corresponding to frowning.

In a fourth expression example 1640, the system 100 may animate a fourth facial expression corresponding to being unable to hear the speaker. The system 100 may generate the fourth facial expression when the system 100 detects issues with an audio quality and/or the like. In a fifth expression example 1650, the system 100 may animate a fifth facial expression corresponding to being confused. For example, the system 100 may generate the fifth facial expression when the system 100 is unable to understand the speaker.

In a sixth expression example 1660, the system 100 may animate a sixth facial expression or a seventh facial expression to track a position of the speaker to which the system 100 is listening. For example, if there are two users present in front of the device 110, the device 110 may distinguish between the two users and listen to one of the users. To visually indicate to which user the device 110 is listening, the system 100 may animate the sixth facial expression (e.g., to identify a first user to the left of the device 110 when looking at the device) or the seventh facial expression (e.g., to identify a second user to the right of the device 110 when looking at the device 110).

Figure 17:
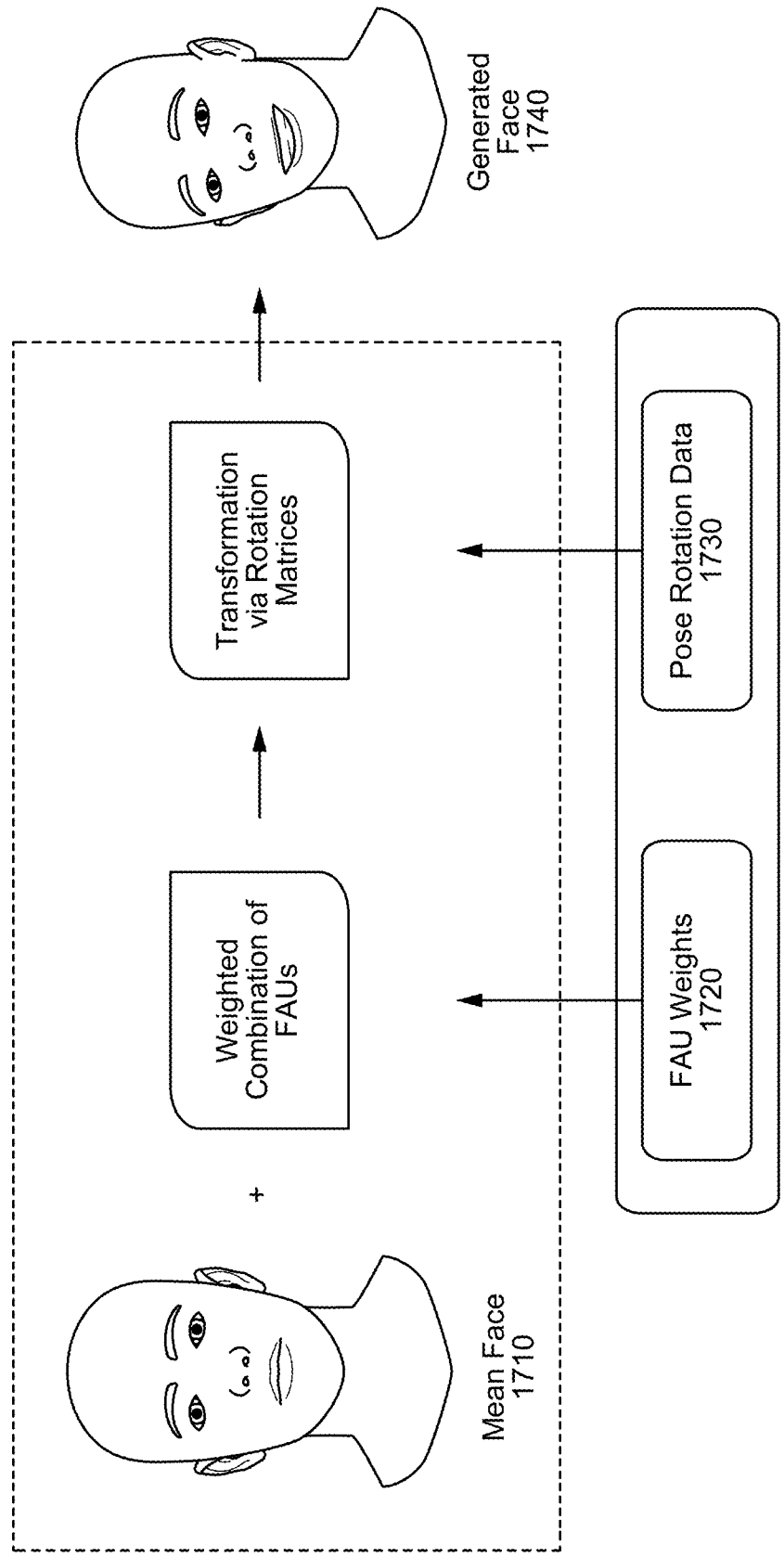
FIG. 17 is a conceptual diagram illustrating an example of generating a mesh model representing a facial animation using facial action units according to embodiments of the present disclosure.

FIG. 17 is a conceptual diagram illustrating an example of generating a mesh model representing a facial animation using facial action units (FAUs) according to embodiments of the present disclosure. In some examples, the system 100 may generate a mesh model corresponding to a facial animation using a combination of facial action unit (FAU) weights (e.g., parameters representing a face shape) and pose rotation data (e.g., parameters used to perform a transformation operation). As shown in facial animation example 1700 illustrated in FIG. 17, the system 100 may process a mean face 1710 (e.g., neutral mesh model) using FAU weights 1720 (e.g., weighted combination of FAUs) and pose rotation data 1730 (e.g., transformation via rotation matrices) to generate a generated face 1740 (e.g., mesh model representing the animated face).

In the facial animation example 1700, the system 100 may control different parts of the face using individual FAUs, which enable the system 100 to easily modify parameters associated with multiple facial features with a single command. Thus, the FAUs may create lifelike facial expressions and/or animations without requiring the system 100 to individually modify each facial feature, which could create unrealistic facial expressions. In contrast, the pose rotation data 1730 may modify the mesh model corresponding to the FAU weights 1720 to match posture and/or a pose. For example, the pose rotation data 1730 may include pose rotation matrices and may correspond to a transformation of the mesh model based on the desired pose, although the disclosure is not limited thereto.

While the facial animation example 1700 is directed to generating a facial animation and only modifies facial action units, the disclosure is not limited thereto and the system 100 may control other parts of the mesh model using additional action units without departing from the disclosure. For example, the system 100 may modify weights associated with other action units (e.g., body action units) to control additional body parts associated with the mesh model. Thus, the system 100 may modify the generated mesh model to perform gestures such as shrugging shoulders, raising a hand, pointing, and/or the like using these body action units without departing from the disclosure.

In some examples, the system 100 may generate a listener animation using a series of mesh models, such that the generated face 1740 is one facial expression in a series of facial expressions represented using mesh model data. However, the disclosure is not limited thereto, and the system 100 may generate the listener animation using other techniques without departing from the disclosure. For example, the system 100 may generate a series of commands, with each command including FAU weights 1720 and pose rotation data 1730, such that each command corresponds to one facial expression in the series of facial expressions. Thus, the system 100 may generate the listener animation using a single mesh model modified by the series of commands without departing from the disclosure.

Figure 18:
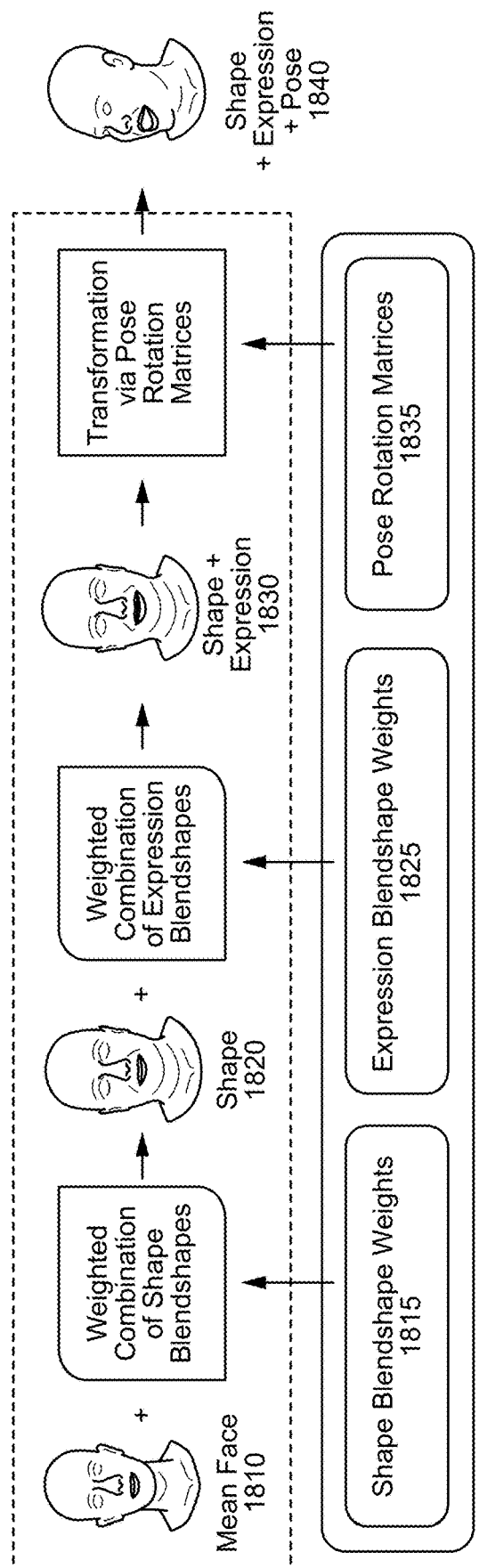
FIG. 18 is a conceptual diagram illustrating an example of generating a mesh model representing a facial animation using a combination of shape, expression, and pose according to embodiments of the present disclosure.

FIG. 18 is a conceptual diagram illustrating an example 1800 of generating a mesh model representing a facial animation using a combination of shape, expression, and pose according to embodiments of the present disclosure. As illustrated in FIG. 18, the system 100 may generate a mesh model corresponding to a facial animation using a combination of shape parameters (e.g., parameters representing a face shape), expression parameters (e.g., parameters representing facial expression(s)), and pose parameters (e.g., parameters used to perform a transformation operation).

As described above, the shape parameters correspond to unique characteristics of the user, such as a relative shape of the user's face and/or head, relative positions of facial features, relative size of facial features, and/or the like. As illustrated in FIG. 18, the shape parameters may be represented as shape blendshape weights 1815, although the disclosure is not limited thereto. The shape parameters are unique to an individual face of the user and enable the system 100 to modify a mean face model 1810 to generate a shape model 1820 that corresponds to the user's specific facial shape.

The expression parameters correspond to unique characteristics of a particular facial expression associated with the user's face, such as current positions of facial landmarks, motion associated with facial landmarks, and/or the like. As illustrated in FIG. 18, the expression parameters may be represented as expression blendshape weights 1825, although the disclosure is not limited thereto. The expression parameters are unique to the facial expression itself, not the user's face, and enable the system 100 to modify the shape model 1820 to generate a shape+expression model 1830.

Finally, the pose parameters are specific to a current pose of the user and enable the system 100 to transform the shape+expression model 1830 to match the user's pose and/or body position. For example, the system 100 may use the pose parameters to modify the shape+expression model 1830 and generate a shape+expression+pose model 1840. As illustrated in FIG. 18, the pose parameters may be represented as pose rotation matrices 1835, although the disclosure is not limited thereto.

In some examples, the system 100 may perform facial analysis to generate a three-dimensional (3D) model of the user's face. For example, the system 100 may input image data representing the user's face to a model configured to output 3D Morphable Model (3DMM) parameters for a dense 3D mesh representation of the user's face. However, the disclosure is not limited to 3DMM parameters and the system 100 may determine other parameters without departing from the disclosure. As used herein, the 3D mesh representation may be referred to as a mesh model, although the disclosure is not limited thereto.

The 3DMM parameters used to generate a representation of the user's face may include shape parameters (e.g., parameters representing a face shape), expression parameters (e.g., parameters representing facial expression(s)), pose parameters (e.g., scalar parameter, rotation vector, translation vector, and/or the like), and/or additional parameters corresponding to the face. As described above, the shape parameters correspond to unique characteristics of the user, such as a relative shape of the user's face and/or head, relative positions of facial features, relative size of facial features, and/or the like. Thus, the shape parameters are unique to an individual face of the user and enable the system 100 to model the user's specific facial shape (e.g., shape deformed mesh 1920). In contrast, the expression parameters correspond to unique characteristics of a particular facial expression associated with the user's face, such as current positions of facial landmarks, motion associated with facial landmarks, and/or the like. Thus, the expression parameters are unique to the facial expression itself, not the user's face, and enable the system 100 to model the user's facial expression(s) (e.g., expression deformed mesh 1925). Finally, the pose parameters are specific to a current pose of the user and enable the system 100 to transform the mesh model to match the user's pose and/or body position.

Using only the shape parameters, the system 100 may generate the shape deformed mesh 1920. Using only the expression parameters, the system 100 may generate the expression deformed mesh 1925, which may also be referred to as an agnostic facial representation 1960. For example, the agnostic facial representation 1960 represents the facial expression of the user without including any identifiable characteristics that are unique to the user. In some examples, the system 100 may use a combination of the shape parameters and the expression parameters to model the user's specific shape with the user's facial expression(s) (e.g., shape and expression deformed mesh 830).

Figure 19A:
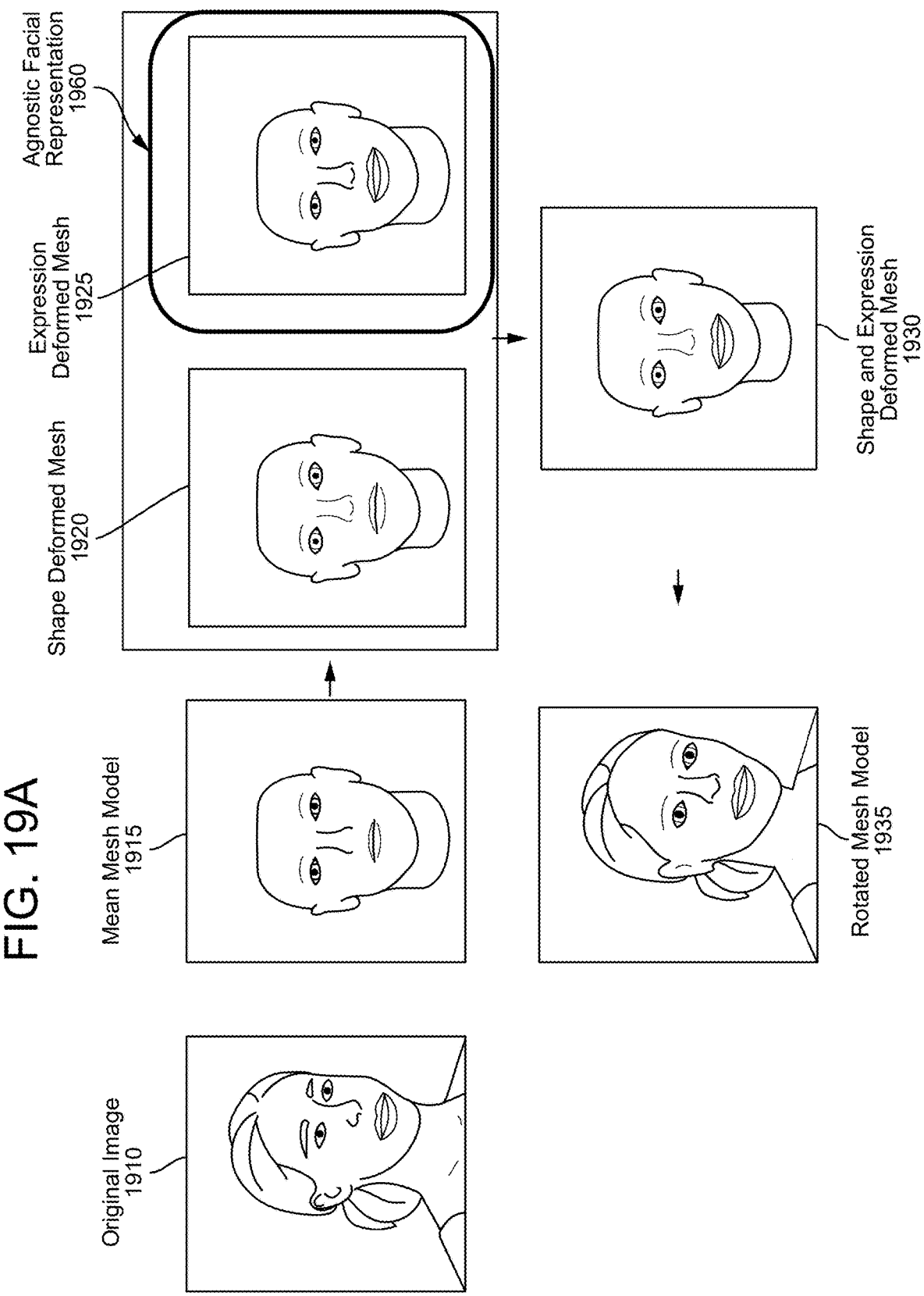

FIGS. 19A-19B are conceptual diagrams illustrating examples of generating mesh models representing facial animations according to embodiments of the present disclosure. As illustrated in FIG. 19A, the system 100 may be configured to process image data representing a user's face and determine three separate types of parameters associated with the face as it is represented in the image data. As described in greater detail above, the system 100 may determine shape parameters (e.g., shape weights), expression parameters (e.g., expression weights), pose parameters (e.g., pose rotation matrices), and/or the like, although the disclosure is not limited thereto.

In some examples, the system 100 may determine these parameters as part of animating non-verbal facial expressions during an interaction with the user. For example, the system 100 may generate image data representing the user while the user is speaking, determine parameters representing facial motion of the user, process the parameters using a trained model (e.g., listener-aware animation model) to predict facial motion responsive to the user's speech, and then generate facial animations representing the predicted facial motion. However, the disclosure is not limited thereto, and the system 100 may determine the parameters as part of enabling other functionality without departing from the disclosure.

To illustrate a first example, the system 100 may determine these parameters as part of determining sentiment information about the user, enabling the system 100 to infer the user's mood, estimate a user satisfaction score, generate estimated user feedback data, and/or the like. In other examples, the system 100 may determine these parameters as part of modeling facial expressions, such as during the training described above with regard to FIGS. 12-13. For example, the system 100 may group a sequence of video frames representing a facial expression and track these parameters over the sequence of video frames, enabling the system 100 to generate a representation of the facial expression. Additionally or alternatively, the system 100 may track these parameters as part of generating a mesh representation of the user, enabling the system 100 to generate a virtual representation (e.g., avatar) of the user.

In some examples, the system 100 may perform facial analysis to generate a three-dimensional (3D) model of the user's face. For example, the system 100 may input image data representing the user's face to a model configured to output 3D Morphable Model (3DMM) parameters for a dense 3D mesh representation of the user's face. However, the disclosure is not limited to 3DMM parameters and the system 100 may determine other parameters without departing from the disclosure. As used herein, the 3D mesh representation may be referred to as a mesh model, although the disclosure is not limited thereto.

The 3DMM parameters used to generate a representation of the user's face may include shape parameters (e.g., parameters representing a face shape), expression parameters (e.g., parameters representing facial expression(s)), pose parameters (e.g., scalar parameter, rotation vector, translation vector, and/or the like), and/or additional parameters corresponding to the face. As described above, the shape parameters correspond to unique characteristics of the user, such as a relative shape of the user's face and/or head, relative positions of facial features, relative size of facial features, and/or the like. Thus, the shape parameters are unique to an individual face of the user and enable the system 100 to model the user's specific facial shape (e.g., shape deformed mesh 1920). In contrast, the expression parameters correspond to unique characteristics of a particular facial expression associated with the user's face, such as current positions of facial landmarks, motion associated with facial landmarks, and/or the like. Thus, the expression parameters are unique to the facial expression itself, not the user's face, and enable the system 100 to model the user's facial expression(s) (e.g., expression deformed mesh 1925). Finally, the pose parameters are specific to a current pose of the user and enable the system 100 to transform the mesh model to match the user's pose and/or body position.

Using only the shape parameters, the system 100 may generate the shape deformed mesh 1920. Using only the expression parameters, the system 100 may generate the expression deformed mesh 1925, which may also be referred to as an agnostic facial representation 1960. For example, the agnostic facial representation 1960 represents the facial expression of the user without including any identifiable characteristics that are unique to the user. In some examples, the system 100 may use a combination of the shape parameters and the expression parameters to model the user's specific shape with the user's facial expression(s) (e.g., shape and expression deformed mesh 830).

As illustrated in FIG. 19A, the shape and expression deformed mesh 1930 can be modified to generate a rotated mesh model 1935 that corresponds to the original image 1910. For example, the system 100 may transform the shape and expression deformed mesh 1930 to generate the rotated mesh model 1935 using the pose parameters, which may include a scalar parameter, a rotation vector, a translation vector, and/or additional parameters.

In some examples, the model may be a deep neural network (DNN) model that is trained to take the output of a face detector (e.g., a portion of image data cropped around a face) as input and directly output the 3DMM parameters, although the disclosure is not limited thereto. To illustrate this concept, FIG. 19A illustrates an example of fitting a 3D mesh model on a two-dimensional (2D) image using the output from the DNN model. For example, FIG. 19A illustrates an original image 1910 that is input to the DNN model and applied to a neutral mesh model, illustrated as mean mesh model 1915. The mean mesh model 1915 is a baseline or average mesh model that can be modified using shape parameters and/or expression parameters to model the user's face. For example, shape deformed mesh 1920 illustrates an example of the mean mesh model 1915 being deformed to match only a shape of the user's face, expression deformed mesh 1925 illustrates an example of the mean mesh model 1915 being deformed to match only facial expressions of the user's face, and shape and expression deformed mesh 1930 illustrates an example of the mean mesh model 1915 being deformed to match both a shape of the user's face and facial expressions of the user's face.

While FIG. 19A conceptually illustrates an example of how the system 100 may model the original face represented in the original image 1910, the disclosure is not limited thereto and the system 100 may generate a mesh model using only the expression parameters (e.g., without the shape parameters) without departing from the disclosure. Thus, the expression deformed mesh 1925 corresponds to an agnostic facial representation 1960 that removes any personally identifiable information or unique characteristics associated with the user. In addition to potentially protecting a privacy of the user, removing any identifiable characteristics unique to the user enables the system 100 to generate additional listening styles by modifying the shape parameters, although the disclosure is not limited thereto.

As illustrated in FIG. 19B, in some examples the system 100 may perform agnostic facial generation 1950 to generate the agnostic facial representation 1960 without modeling the shape parameters. For example, the system 100 may process the original image 1910 to generate a portion of the 3DMM parameters, such as the expression parameters along with pose parameters (e.g., the scalar parameter, the rotation vector, the translation vector, and/or the like). While the device 110 does not generate a mesh model using the portion of the 3DMM parameters, FIG. 19B illustrates that the portion of the 3DMM parameters may correspond to a rotated mesh model 1955. However, unlike the rotated mesh model 1935, the rotated mesh model 1955 is not generated using the shape parameters, as the portion of the 3DMM parameters does not include the shape parameters.

After generating the portion of the 3DMM parameters, in some examples the system 100 may remove the rotation and/or other pose parameters, as well as perform de-identification to generate only the expression parameters. The system 100 may generate a mesh model using the expression parameters, represented in FIG. 19B as an agnostic facial representation 1960. However, the disclosure is not limited thereto, and in some examples the system 100 may only determine the expression parameters and/or generate a portion of the mesh model without departing from the disclosure. While FIGS. 19A-19B illustrate examples of generating mesh models representing a user's face, the disclosure is not limited thereto and the system 100 may generate mesh models representing the user's entire body without departing from the disclosure.

In some examples, the system 100 may use similar techniques as described above with regard to FIGS. 17-19A to perform body animation. For example, the system 100 may represent a user using shape parameters to generate a first mesh model (e.g., body shape), may represent the user using shape parameters and expression parameters to generate a second mesh model (e.g., body shape+expression), and/or may represent the user using shape parameters, expression parameters, and pose parameters to generate a third mesh model (e.g., body shape+expression+pose), although the disclosure is not limited thereto.

In some examples, the system 100 may represent the user using the expression parameters to generate a mesh model exhibiting facial expressions, body language, gestures, and/or other body movement associated with the expression parameters, without using the shape parameters that correspond to unique characteristics specific to the user. Additionally or alternatively, instead of the mesh model corresponding to an entire body of the user, the mesh model may correspond to a portion of the user without departing from the disclosure. For example, the system 100 may generate a mesh model representing the user's face and arms, the user's face and upper body, and/or the like without departing from the disclosure. Thus, the system 100 may capture certain hand gestures and/or body language without modeling the entire body of the user.

Figure 20:
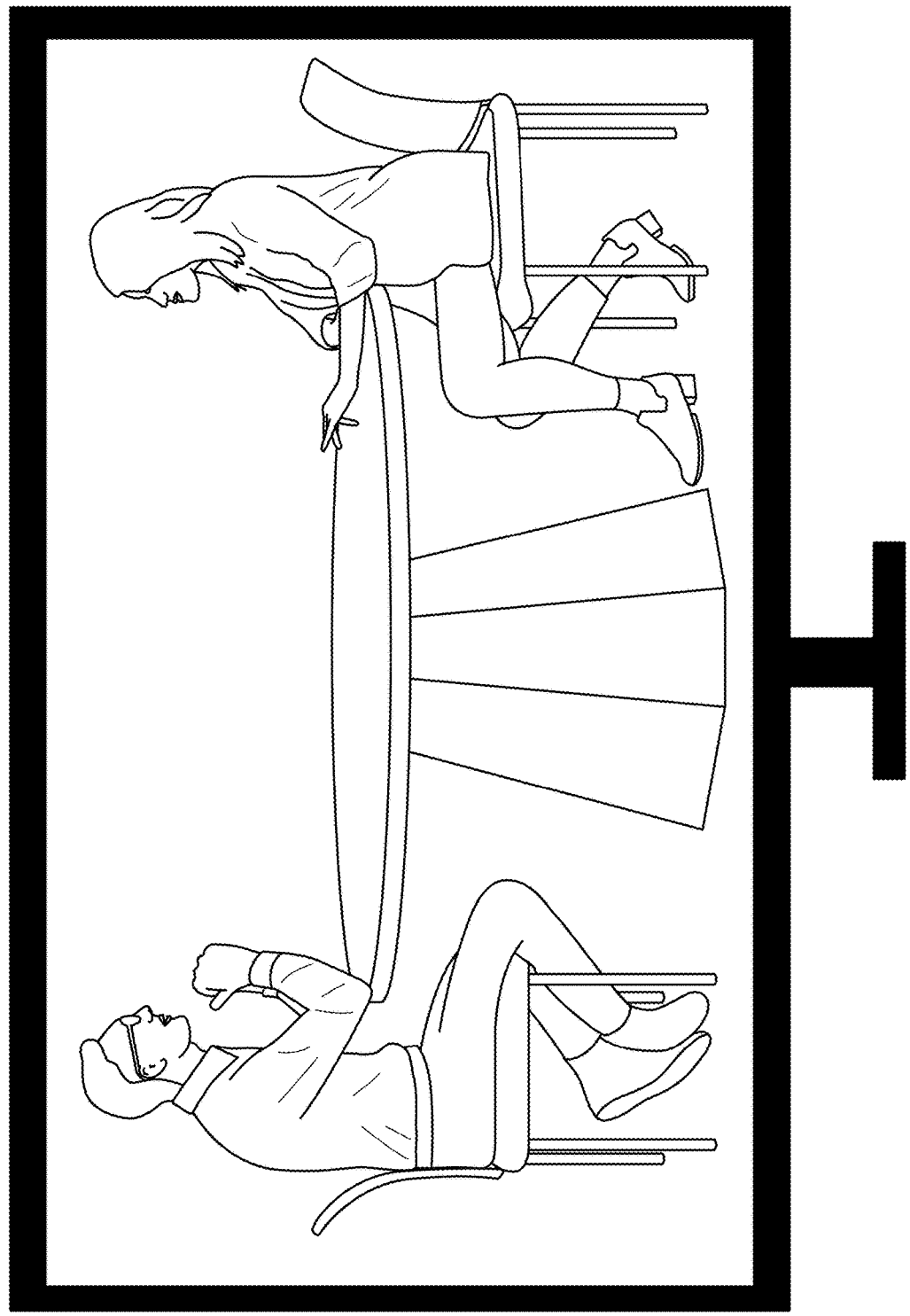
FIG. 20 illustrates an example of a virtual business meeting according to embodiments of the present disclosure.

FIG. 20 illustrates an example of a virtual business meeting according to embodiments of the present disclosure. As illustrated in FIG. 20, the system 100 may perform the style-aware listener animation as part of a virtual business meeting 2000 involving two users without departing from the disclosure. For example, while a first virtual representation (e.g., first avatar) associated with a first user is speaking, the system 100 may perform the style-aware listener animation to animate a second virtual representation (e.g., second avatar) associated with a second user to indicate that the second user is listening. Similarly, the system 100 may perform the style-aware listener animation to animate the first avatar while the first user is listening to the second user. Thus, the system 100 may extend the style-aware listener animation to virtual environments without departing from the disclosure, including extending the style-aware listener animation to animate human-to-human interactions.

While the virtual business meeting 2000 illustrated in FIG. 20 corresponds to a virtual business environment, the disclosure is not limited thereto. In some examples, the system 100 may extend the style-aware listener animation to other virtual environments without departing from the disclosure. For example, the system 100 may apply the style-aware listener animation to animate listeners in augmented reality environments (e.g., virtual vendor represented in an augmented reality marketplace), virtual reality environments (e.g., avatars represented in virtual business meetings, non-business recreational pursuits, and/or the like as part of immersive virtual worlds), gaming environments (e.g., avatars associated with users and/or non-playable characters (NPCs) as part of online gaming), graphical environments (e.g., characters rendered in a graphical environment as part of local gaming, user-customized digital content, etc.), and/or the like.

In some examples, the system 100 may apply the style-aware listener animation to animate avatars that are associated with fixed content, which may correspond to repetitive transactions, pre-programmed routines, limited feedback prompts, and/or the like. In these examples, the system 100 may generate the style-aware listener animation using only input data associated with the user speaking (e.g., audio data representing speech, video data representing the user, motion data corresponding to the user, and/or the like). In other examples, the system 100 may apply the style-aware listener animation to animate avatars that are associated with dynamic machine-generated content, which may correspond to a virtual assistant, artificial intelligence (AI), dynamic programming and/or feedback prompts, and/or the like. In these examples, the system 100 may generate the style-aware listener animation using the input data associated with the user speaking as described above (e.g., audio data, video data, motion data, and/or the like), along with additional inputs associated with the dynamic machine-generated content. For example, the dynamic machine-generated content may specify a particular listener style, may modify a current listener style, may indicate specific animations and/or expressions, and/or may send the system 100 other parameters with which the system 100 may tailor the listener animation.

As illustrated in FIG. 20, the system 100 may apply the style-aware listener animation to animate avatars during human-to-human interactions without departing from the disclosure. In some human-to-human interactions, the system 100 may generate the style-aware listener animation using only first input data associated with a first user that is speaking. For example, the first input data may include first audio data representing first speech generated by the first user, first image data representing the first user while speaking, first motion data corresponding to the first user, and/or the like. However, the disclosure is not limited thereto, and in other human-to-human interactions, the system 100 may generate the style-aware listener animation using second input data associated with a second user that is listening. For example the first input data may include first audio data representing first speech generated by the first user, first image data representing the first user while speaking, first motion data corresponding to the first user, and/or the like.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 21:
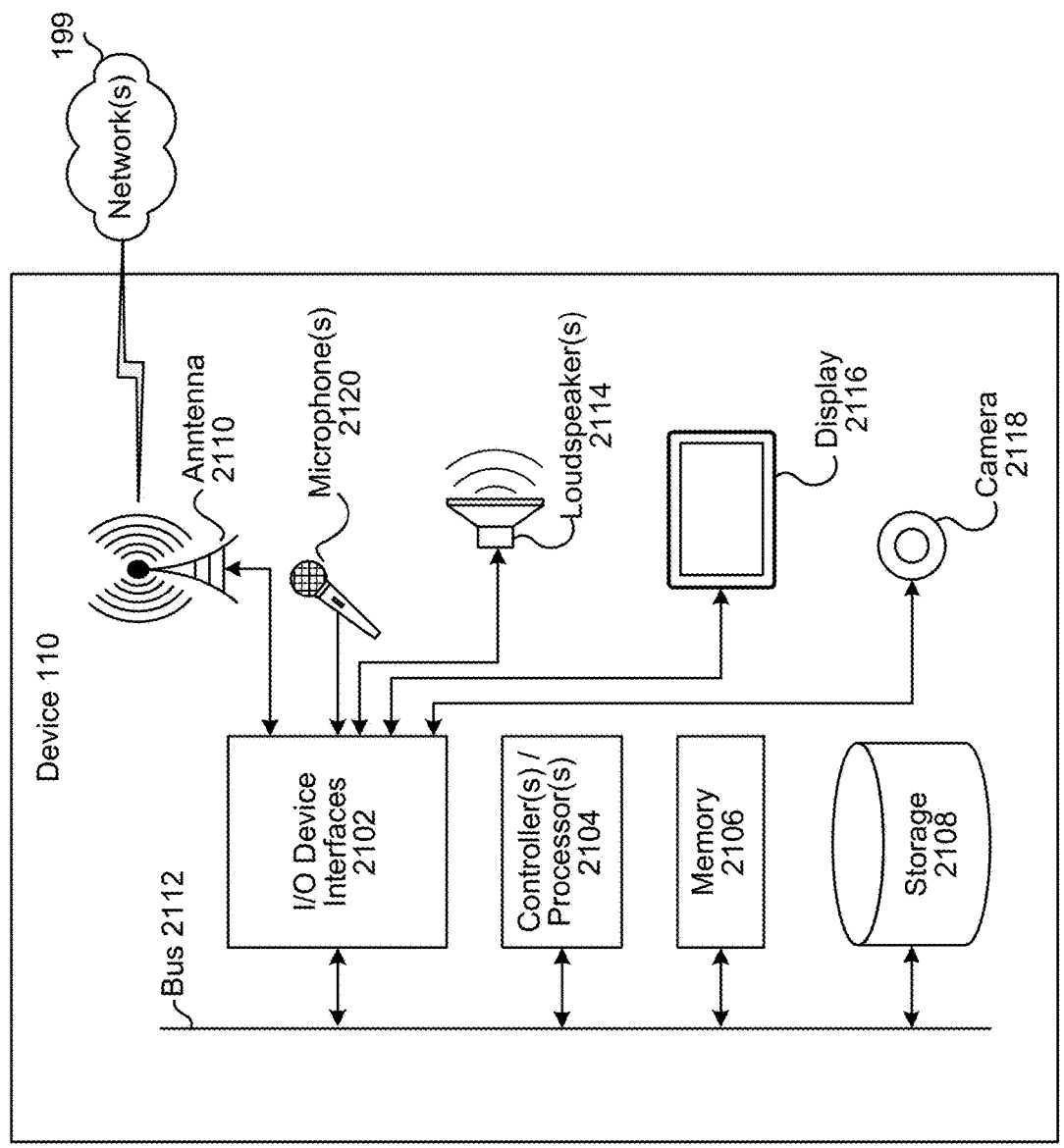
FIG. 21 is a block diagram conceptually illustrating example components of a device, according to embodiments of the present disclosure.
Figure 22:
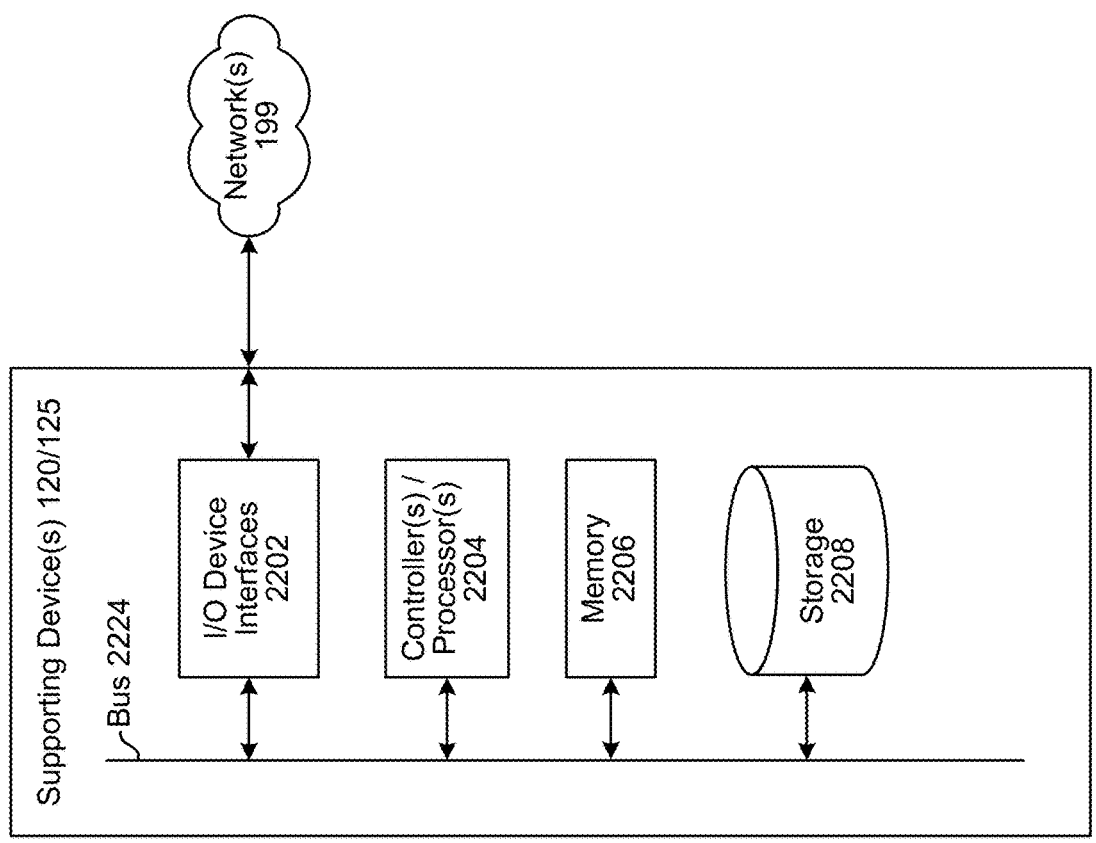
FIG. 22 is a block diagram conceptually illustrating example components of a system, according to embodiments of the present disclosure.

FIG. 21 is a block diagram conceptually illustrating a device 110 that may be used with the system. FIG. 22 is a block diagram conceptually illustrating example components of a remote device, such as the supporting device(s) 120, which may assist with ASR processing, NLU processing, etc., and skill device(s) 125. The device(s) (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

The supporting device(s) 120 may correspond to cloud devices that operates at a location not proximate to device 110. The supporting device(s) 120 may also operate at a similar location to device 110, though perhaps in a different physical device such as a home server, edge server, or the like. The supporting device(s) 120 may also be a distributed system where certain components/operations occur using device(s) at one location and other components/operations occur using device(s) at another location.

Each of these devices (110/120/125) may include one or more controllers/processors (2104/2204), which may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive memory (MRAM), and/or other types of memory. Each device (110/120/125) may also include a data storage component (2108/2208) for storing data and controller/processor-executable instructions. Each data storage component (2108/2208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2102/2202).

Computer instructions for operating each device (110/120/125) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120/125) includes input/output device interfaces (2102/2202). A variety of components may be connected through the input/output device interfaces (2102/2202), as will be discussed further below. Additionally, each device (110/120/125) may include an address/data bus (2124/2224) for conveying data among components of the respective device. Each component within a device (110/120/125) may also be directly connected to other components in addition to (or instead of) being connected to other components across the bus (2124/2224).

Referring to FIG. 21, the device 110 may include input/output device interfaces 2102 that connect to a variety of components such as an audio output component such as a loudspeaker 2114, a wired headset or a wireless headset (not illustrated), or other component capable of outputting audio. The device 110 may also include an audio capture component. The audio capture component may be, for example, a microphone 2120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. An array of microphones may also be used to perform beamforming/other techniques to determine a direction of a sound's point of origin relative to the device 110. Data from the array of microphones as well as other components may be used to track a sound's source as it moves around an environment of a device 110. The device 110 may additionally include a display 2116 for displaying content. The device 110 may further include a camera 2118.

Via antenna(s) 2110, the input/output device interfaces 2102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2102/2202) may also include communication components that allow data to be exchanged between devices such as different physical servers in a collection of servers or other components.

The components of the device(s) 110, the supporting device(s) 120, or skill device(s) 125 may include their own dedicated processors, memory, and/or storage. Alternatively, one or more of the components of the device(s) 110, the supporting device(s) 120, or skill device(s) 125 may utilize the I/O interfaces (2102/2202), processor(s) (2104/2204), memory (2106/2206), and/or storage (2108/2208) of the device(s) 110, supporting device(s) 120, or the skill device(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the supporting device(s) 120, and skill device(s) 125, as described herein, are illustrative, and may be located as a stand-alone device or may be included, in whole or in part, as a component of a larger device or system.

As illustrated in FIG. 23, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a smart phone 110a, speech-detection device(s) with display 110b, speech-detection device(s) 110c, a tablet computer 110d, an input/output (I/O) limited device 110e, a smart television 110f, and/or a motile device 110g may be connected to the network(s) 199 through a wireless service provider, over a WiFi or cellular network connection, or the like. Other devices are included as network-connected support devices, such as the supporting device(s) 120, the skill device(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250/350, the NLU component 260/360, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, from a microphone of a device, first audio data that includes a representation of first speech of a first user;
   receiving, from an image sensor of the device, first image data representing a face of the first user;
   generating, using the first image data, first motion data representing first facial motion of the first user corresponding to the first speech;
   generating, by a machine learning transformer component using the first audio data and the first motion data, first embedding data that represents the first facial motion, wherein the first embedding data corresponds to a first coordinate system;
   determining, using a first identifier representing a listener style, second embedding data corresponding to the first coordinate system;
   generating, by a first machine learning model using the first embedding data and the second embedding data, first animation data corresponding to second facial motion responsive to the first speech;
   generating, using the first animation data, second image data representing a synthetic face engaging in the second facial motion; and
   presenting, on a display of the device, the second image data.

2. The computer-implemented method of claim 1, further comprising:
   receiving, by the device from a second device, third image data representing a second face of a second user;
   generating, using the third image data, second motion data representing third facial motion of the second user; and
   generating, by the machine learning transformer component using the second motion data, third embedding data that represents the third facial motion, wherein the third embedding data corresponds to the first coordinate system,
   wherein the first animation data is generated using the third embedding data.

3. The computer-implemented method of claim 1, further comprising:
   receiving third image data representing a second face of a second user;
   generating, using the third image data, second motion data representing third facial motion of the second user; and
   generating, by a second machine learning model using the second motion data, the second embedding data associated with the first identifier.

4. The computer-implemented method of claim 1, further comprising:
   determining that the first image data represents a second face of a second user;
   determining, using the first image data, a first position associated with the first user;
   determining, using the first image data, a second position associated with the second user; and
   determining that the first user is speaking,
   wherein the second facial motion corresponds to looking at the first position associated with the first user.

5. A computer-implemented method, the method comprising:
   receiving first audio data representing first speech of a first user;
   receiving first motion data representing first facial motion of the first user, the first facial motion corresponding to the first speech;
   processing the first audio data and the first motion data using a first model to determine first data representing the first facial motion;
   determining, using a first identifier corresponding to a listener style, second data representing second facial motion;
   determining, using the second data, embedding data;
   generating, by a second model using the first data and the embedding data, first animation data corresponding to third facial motion responsive to the first speech; and
   generating, using the first animation data, first image data animating a virtual face according to the third facial motion.

6. The computer-implemented method of claim 5, further comprising:
   receiving second image data representing a second user;
   generating, using the second image data, second motion data representing fourth facial motion of the second user; and generating, using the second motion data, the embedding data, wherein the embedding data corresponds to a first coordinate system.

7. The computer-implemented method of claim 5, further comprising:
performing language processing using the first audio data to generate first language data,
wherein the first animation data is generated by the second model using the first language data.

8. The computer-implemented method of claim 5, further comprising:
receiving second image data that represents a face of a second user;
generating, using the second image data, second motion data representing fourth facial motion of the second user; and
generating, by a third model using the second motion data, the embedding data.

9. The computer-implemented method of claim 5, wherein generating the first animation data further comprises:
determining a first plurality of expression parameters corresponding to a first video frame included in the first image data; and
determining a second plurality of expression parameters corresponding to a second video frame included in the first image data, the second video frame following the first video frame.

10. The computer-implemented method of claim 5, further comprising:
receiving second image data that represents the first user and a second user;
determining that a first portion of the second image data represents the first user;
determining that a second portion of the second image data represents the second user;
determining, using the first portion of the second image data, a first direction associated with the first user;
determining, using the second portion of the second image data, a second direction associated with the second user; and
determining that the first user is speaking,
wherein the third facial motion corresponds to the virtual face looking in the first direction associated with the first user.

11. The computer-implemented method of claim 5, further comprising:
determining that an audio quality associated with the first audio data is below a threshold value;
generating second animation data corresponding to third fourth facial motion indicating that the audio quality is low; and
generating, using the second animation data, third second image data animating the virtual face according to the third fourth facial motion.

12. A system comprising:
at least one processor; and
memory including instructions operable to be executed by the at least one processor to cause the system to:
receive first audio data representing first speech of a first user;
receive first motion data representing first facial motion of the first user, the first facial motion corresponding to the first speech;
process the first audio data and the first motion data using a first model to determine first data representing the first facial motion;
generate, by a second model using the first data and a first identifier corresponding to a listener style, first animation data corresponding to second facial motion responsive to the first speech, wherein generating the first animation data includes:
determining a first plurality of expression parameters corresponding to a first video frame, and
determining a second plurality of expression parameters corresponding to a second video frame, the second video frame following the first video frame; and
generate, using the first animation data, first image data animating a virtual face according to the second facial motion.

13. The system of claim 12, wherein the memory further comprises instructions that, when executed by the at least one processor, further cause the system to:
receive second image data representing a second user;
generate, using the second image data, second motion data representing third facial motion of the second user; and
generate, using the second motion data, embedding data that represents the third facial motion, wherein the embedding data corresponds to a first coordinate system,
wherein the first animation data is generated using the embedding data.

14. The system of claim 12, wherein the memory further comprises instructions that, when executed by the at least one processor, further cause the system to:
perform language processing using the first audio data to generate first language data,
wherein the first animation data is generated by the second model using the first language data.

15. The system of claim 12, wherein the memory further comprises instructions that, when executed by the at least one processor, further cause the system to:
receive second image data that represents a face of a second user;
generate, using the second image data, second motion data representing third facial motion of the second user; and
generate, by a third model using the second motion data, embedding data associated with the first identifier.

16. The system of claim 12, wherein the memory further comprises instructions that, when executed by the at least one processor, further cause the system to:
determine, using the first identifier, first codebook data representing third facial motion;
determine, using the first codebook data, embedding data; and
generate the first animation data using the first data and the embedding data.

17. The system of claim 12, wherein the memory further comprises instructions that, when executed by the at least one processor, further cause the system to:
receive second image data that represents the first user and a second user;
determine that a first portion of the second image data represents the first user;
determine that a second portion of the second image data represents the second user;

determine, using the first portion of the second image data, a first direction associated with the first user;

determine, using the second portion of the second image data, a second direction associated with the second user; and determine that the first user is speaking, wherein the second facial motion corresponds to the virtual face looking in the first direction associated with the first user.

18. The system of claim 12, wherein the memory further comprises instructions that, when executed by the at least one processor, further cause the system to:

determine that an audio quality associated with the first audio data is below a threshold value;

generate second animation data corresponding to third facial motion indicating that the audio quality is low; and generate, using the second animation data, second image data animating the virtual face according to the third facial motion.

19. A computer-implemented method, the method comprising:

receiving first image data that represents a face of a first user;

generating, using the first image data, first motion data representing first facial motion of the first user;

generating, by a first model using the first motion data, embedding data associated with a first identifier;

receiving first audio data representing first speech of a second user;

receiving second motion data representing second facial motion of the second user, the second facial motion corresponding to the first speech;

processing the first audio data and the second motion data using a second model to determine first data representing the second facial motion;

generating, by a third model using the first data and the embedding data, first animation data corresponding to third facial motion responsive to the first speech; and generating, using the first animation data, second image data animating a virtual face according to the third facial motion.

\* \* \* \* \*